United States Patent
Yuki et al.

(10) Patent No.: US 10,527,778 B2
(45) Date of Patent: Jan. 7, 2020

(54) LIGHTING DEVICE AND DISPLAY DEVICE

(71) Applicant: Sharp Kabushiki Kaisha, Sakai, Osaka (JP)

(72) Inventors: Ryuzo Yuki, Sakai (JP); Katsutoshi Kikuchi, Sakai (JP); Hayato Nakamura, Sakai (JP); Makoto Yoshimura, Sakai (JP); Hiromi Enomoto, Sakai (JP); Mitsuhiro Murata, Sakai (JP); Hisashi Watanabe, Sakai (JP); Hirotoshi Yasunaga, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 32 days.

(21) Appl. No.: 15/759,232

(22) PCT Filed: Sep. 8, 2016

(86) PCT No.: PCT/JP2016/076382
§ 371 (c)(1),
(2) Date: Mar. 12, 2018

(87) PCT Pub. No.: WO2017/047488
PCT Pub. Date: Mar. 23, 2017

(65) Prior Publication Data
US 2018/0239078 A1   Aug. 23, 2018

(30) Foreign Application Priority Data

Sep. 15, 2015   (JP) .................................. 2015-181669

(51) Int. Cl.
*G04B 19/30*   (2006.01)
*F21V 8/00*    (2006.01)

(52) U.S. Cl.
CPC ......... G02B 6/0068 (2013.01); G02B 6/0083 (2013.01); G02B 6/0091 (2013.01); *G02B 6/0045* (2013.01)

(58) Field of Classification Search
CPC combination set(s) only.
See application file for complete search history.

(56) References Cited

U.S. PATENT DOCUMENTS 7,134,768 B2 * 11/2006 Suzuki ................. B60Q 1/0052
                                                  362/241
2005/0111239 A1   5/2005 Hosobuchi
(Continued)

FOREIGN PATENT DOCUMENTS

CN    100357769 C    12/2007
JP    2004-198681 A   7/2004
(Continued)

OTHER PUBLICATIONS

Official Communication issued in International Patent Application No. PCT/JP2016/076382, dated Nov. 29, 2016.

*Primary Examiner* — Joseph L Williams
*Assistant Examiner* — Jacob R Stern
(74) *Attorney, Agent, or Firm* — Keating & Bennett, LLP

(57) ABSTRACT

A lighting device includes a light guide plate, a first light source, a second light source, and a case. The light guide plate includes plate surfaces and an outer peripheral surface. One of the plate surfaces is configured as a light exiting surface. Sections of the outer peripheral surface on opposite sides from each other relative to the center of the light exiting surface are configured as a first light entering surface and a second light entering surface, respectively. The first light source is disposed opposite the first light entering surface. The second light source is disposed opposite the second light entering surface. The case includes an annular wall portion surrounding an outer circumference of the light (Continued)

guide plate, the first light source, and the second light source. The annular wall portion includes light source non-disposing areas between the first light entering surface and the second light entering surface.

8 Claims, 23 Drawing Sheets

(56) References Cited

U.S. PATENT DOCUMENTS

| | | | |
|---|---|---|---|
| 2011/0096565 A1* | 4/2011 | Wang | G02B 6/0043 362/607 |
| 2011/0176329 A1 | 7/2011 | Lin et al. | |
| 2012/0106198 A1 | 5/2012 | Lin et al. | |

FOREIGN PATENT DOCUMENTS

| | | |
|---|---|---|
| JP | 2006-276359 A | 10/2006 |
| JP | 2011-091047 A | 5/2011 |
| JP | 2011-146369 A | 7/2011 |
| JP | 2012-094514 A | 5/2012 |

* cited by examiner

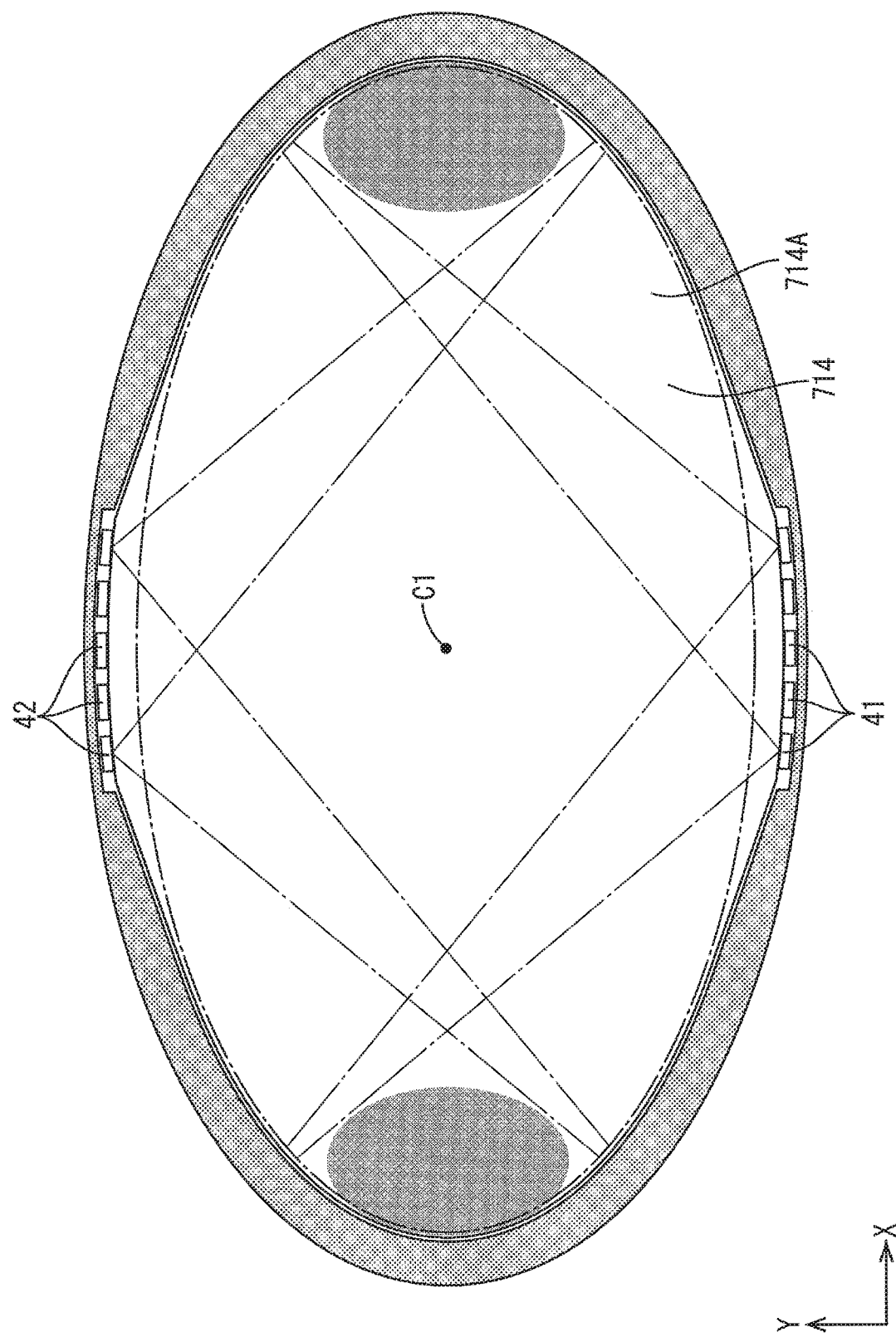

LIGHTING DEVICE AND DISPLAY DEVICE

TECHNICAL FIELD

The present invention relates to a lighting device and a display device.

BACKGROUND ART

Conventionally, a display device described in the following Patent Document 1 has been known. Patent Document 1 describes a liquid crystal display device having a display area having a substantially circular shape. As such a display device, there has been known a display device including a lighting device having a substantially circular shape corresponding to the shape of the display device. Such a lighting device includes a light source and a light guide plate having a substantially circular shape. Light from the light source enters the light guide plate and then exits the light guide plate through the light exiting surface.

Patent Document 1: Japanese Unexamined Patent Publication No. 2006-276359

PROBLEM TO BE SOLVED BY THE INVENTION

When a section of the outer peripheral surface of the light guide plate having a substantially circular shape is a light entering surface in the above configuration, the light from the light source is less likely to reach a portion adjacent to the light entering surface on the outer peripheral edge portion of the light guide plate, and the portion is apt to become a dark portion. As a result, luminance unevenness may occur in the light exiting through the light exiting surface, which has a room for improvement in this respect.

DISCLOSURE OF THE PRESENT INVENTION

The present invention has been accomplished based on the above circumstances, and it is an object of the present invention to reduce luminance unevenness when a light guide plate having a substantially circular shape is provided.

Means for Solving the Problem

In order to solve the above-mentioned problems, a lighting device of the present invention includes a light guide plate, at least one first light source, at least one second light source, and a case. The light guide plate includes a light exiting surface through light exits. The light exiting surface is one of plate surfaces of the light guide plate having a substantially circular shape. The first light entering surface is a section of an outer peripheral surface. The second light entering surface is a section of the outer peripheral surface on an opposite side from the first light entering surface relative to a center of the light exiting surface. The at least one first light source is disposed opposite the first light entering surface. The at least one second light source is disposed opposite the second light entering surface. The case includes an annular wall portion surrounding an outer circumference of the light guide plate, the first light source, and the second light source. The annular wall portion includes a light source non-disposing areas between the first light entering surface and the second light entering surface in which light sources are not disposed.

Conventionally, a lighting device having a shape closer to a circular shape may be required from the viewpoint of designability or the like. In such a lighting device, a light guide plate having a substantially circular shape is used. If a section of the outer peripheral surface of the light guide plate having a substantially circular shape is a light entering surface, light is less likely to reach a portion adjacent to the light entering surface on the outer peripheral edge portion of the light guide plate, and the portion is apt to be a dark portion. Here, if light sources are arranged in a linear form so as to face the light entering surface, the emitting range of light can be further widened, and the dark portion can be reduced. However, when the light sources are arranged in a linear form, it is necessary to linearize a section of an annular wall portion covering the light sources, which makes it difficult to bring the shape of the annular wall portion (eventually, the lighting device) close to a circular shape.

As in the above configuration, when the first light source (first light entering surface) and the second light source (second light entering surface) are disposed with the center of the light exiting surface (light guide plate) interposed therebetween, light from one light entering surface reaches the portion adjacent to the other light entering surface on the outer peripheral end portion of the light guide plate, which makes it possible to reduce the dark portion, thereby allowing luminance unevenness to be reduced. This makes it possible to eliminate the configuration in which the light sources are arranged in a linear form, and to reduce the number of light sources arranged in a linear form. Thereby, the configuration in which a section of the annular wall portion is linearized can be eliminated, and the length of the portion to be linearized can be reduced, whereby the annular wall portion is allowed to have a shape closer to a circular shape.

In the above configuration, the lighting device may be configured as follows. The at least one first light source may include first light sources disposed adjacent to each other. The at least one second light source may include second light sources disposed adjacent to each other. The first light sources may be arranged in a curved form along a shape of the first light entering surface. The second light sources may be arranged in a curved form along a shape of the second light entering surface.

By arranging the light sources, the irradiation range of the light entering the light guide plate through the light entering surface can be further widened, and the luminance unevenness can be further reduced. If the light sources are arranged in a curved form, the shape of the annular wall portion is likely to be brought close to a circular shape as compared with a configuration in which respective light sources are arranged in a linear form. When the light sources adjacent to each other are arranged in a curved form, the light emitted by each light source is likely to be directed toward the center of the light exiting surface, whereby the outer peripheral end portion of the light guide plate is apt to become a dark portion. However, in the above-described configuration, a portion that light emitted by one group of light sources (the first light sources) is less likely to reach can be irradiated with light emitted by the other group of light sources (the second light sources), whereby the dark portion is less likely to occur even when the light sources are arranged in a curved form.

The lighting device may be configured as follows. The light guide plate may include a through hole that extends all the way through the light guide plate in a thickness direction. The light guide plate may further include a light blocking member disposed along an inner surface of the through hole in the light guide plate. The first light source and the second light source may be opposed to each other with the light blocking member therebetween.

The above configuration allows the functional component to be inserted into the through hole. The light blocking member is provided, which makes it possible to suppress a situation where light from each light source leaks to the outside through the through hole. The first light source and the second light source are opposed to each other with the light blocking member therebetween, whereby a situation where the circumference of the light blocking member on the light exiting surface becomes a dark portion can be suppressed.

The lighting device may be configured as follows. The first light source may be disposed such that an optical axis of the first light source does not overlap the light blocking member. The second light source may also be disposed such that an optical axis of the second light source does not overlap the light blocking member. When the light emitted by the light source is reflected by the light blocking member, the circumference of the light blocking member is bright, which may disadvantageously cause luminance unevenness. In the above configuration, the optical axes of the first and second light sources are disposed not to overlap the light blocking member, whereby the amount of light directly directed to the light blocking member can be reduced, thereby allowing the luminance unevenness to be suppressed.

The lighting device may be configured as follows. The light guide plate may have an elliptical shape. The first light entering surface may be at one of ends of the light guide plate with respect to a long direction of the light guide plate. The second light entering surface may be at another one of ends of the light guide plate with respect to the long direction of the light guide plate.

In such a configuration, the light enters the light guide plate through the light entering surface (the first light entering surface or the second light entering surface) spreads in the short direction of the light guide plate. If the light spreads in the long direction of the light guide plate, the light is less likely to reach the ends with respect to the long direction, whereby a dark portion may be created. The light is likely to reach the ends with respect to the short direction as compared with the ends with respect to the long direction of the light guide plate, whereby the dark portion is less likely to be created.

Next, in order to solve the above problems, a display device of the present invention may include a display panel configured to display an image using light from the lighting device. The display device having such a configuration makes it possible to suppress the situation where luminance unevenness occurs, and to achieve display having high display quality.

The lighting device may be configured as follows. The first light source and the second light source configured to emit light rays with a predetermined light distribution around the optical axis of the first light source and a predetermined light distribution around the optical axis of the second light source, respectively. The light ray that travels in a direction angled relative to the optical axis of the first light source with the largest angle in a plan view among the light rays emitted by the first light source may be defined as a first angled light ray. The light ray that travels in a direction angled relative to the optical axis of the second light source with the largest angle in a plan view among the light rays emitted by the second light source may be defined as a second angled light ray. An intersection of a straight line that extends along the first angled light ray and a straight line that extends along the second angled light ray is located outside a display area of the display panel.

Such a configuration makes it possible to reduce the number of areas of the light guide plate overlapping the display area of the display panel where the light rays emitted by the first light source and the light rays emitted by the second light source do not reach. Therefore, the dark portion is less likely to be created.

Advantageous Effect of the Invention

The present invention makes it possible to reduce luminance unevenness when a light guide plate having a substantially circular shape is provided.

BRIEF DESCRIPTION OF THE DRAWINGS

FIG. 23 is a plan view showing Comparative Example according to the eighth embodiment.

BEST MODE FOR CARRYING OUT THE INVENTION

First Embodiment

A first embodiment of the present invention will be described with reference to FIGS. 1 to 7. In the present embodiment, a liquid crystal display device 10 (display device) including a liquid crystal panel 11 is illustrated. The vertical direction of the liquid crystal panel 11 is based on FIG. 1. An upper side and a lower side in FIG. 1 correspond to a front side and a back side of the liquid crystal display device 10, respectively. X-axes, Y-axes, and Z-axes are shown in some drawings. The axes in each drawing correspond to the respective axes in other drawings.

Figure 1:
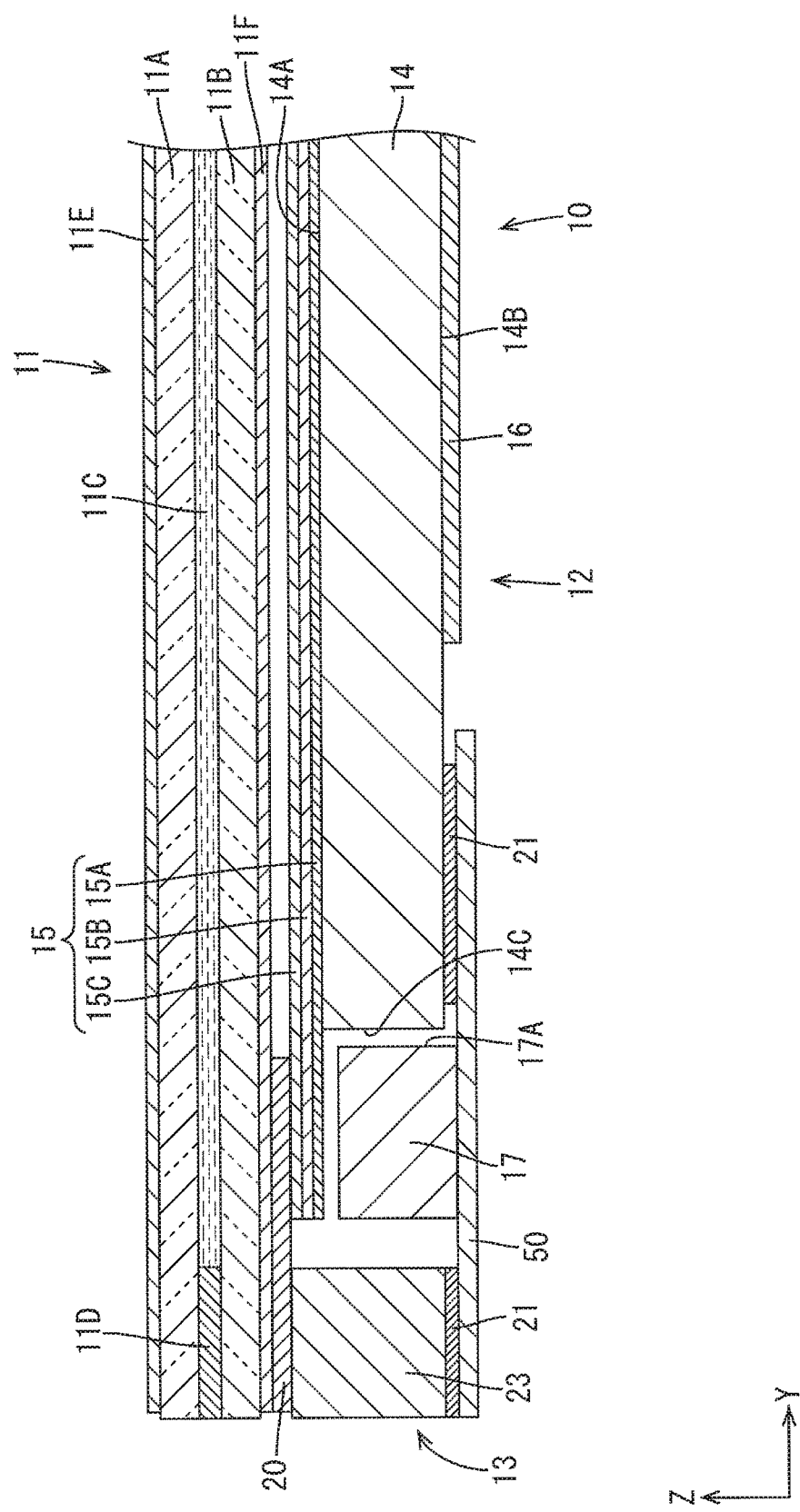
FIG. 1 is a cross-sectional view (corresponding to a view taken along a line I-I in FIG. 2) of a liquid crystal display device according to a first embodiment of the present invention.
Figure 2:
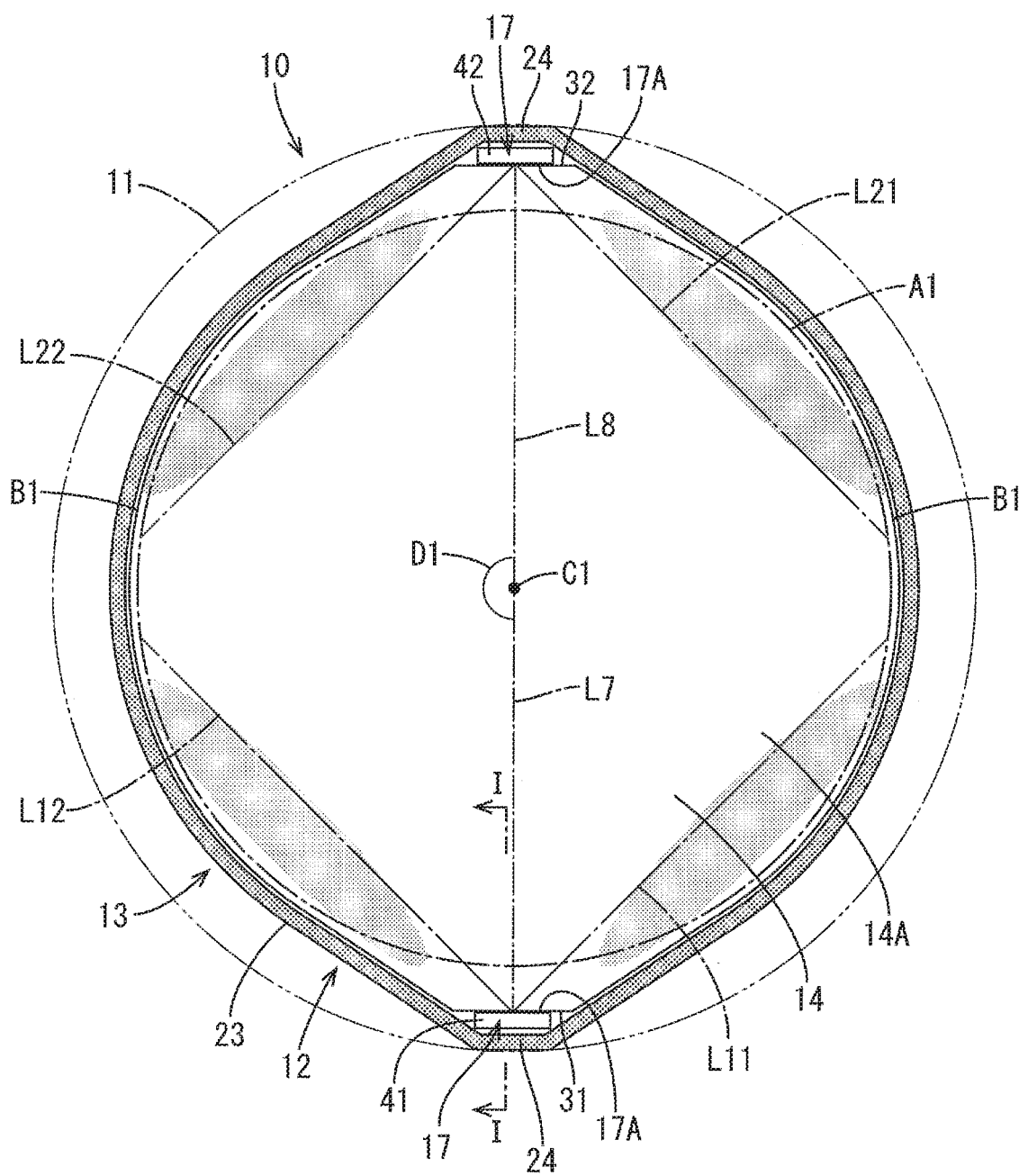
FIG. 2 is a plan view showing a backlight device of FIG. 1.

As shown in FIGS. 1 and 2, the liquid crystal display device 10 has a substantially circular shape as a whole. The liquid crystal display device 10 includes at least a liquid crystal panel 11 configured to display an image, and a backlight device 12 (lighting device) disposed on a back side with respect to the liquid crystal panel 11, and configured to supply light necessary for display to the liquid crystal panel 11. In FIG. 2, the outer shape of the liquid crystal panel 11 is illustrated by a two-dot chain line.

For example, the liquid crystal display device of the present embodiment is preferably used for electronic devices (not illustrated) such as mobile phones (including smart phones or the like), notebook computers (including tablet-type notebook computers or the like), wearable terminals (including smart watches or the like), mobile information terminals (including electronic books and PDA or the like), portable game machines, and digital photo frames, but the liquid crystal display device 10 is not necessarily limited thereto. The screen size of the liquid crystal panel 11 constituting the liquid crystal display device 10 is, for example, from several inches to ten and several inches, which is generally preferably classified as a small or a small-to-medium screen size, but the screen size is not necessarily limited thereto.

First, the liquid crystal panel 11 will be described. The liquid crystal panel 11 is a display panel which performs display using light from the backlight device 12. As shown in FIG. 2, the liquid crystal panel 11 has a substantially circular shape in a plan view as a whole. As shown in FIG. 1, the liquid crystal panel 11 mainly includes a pair of substrates 11A, 11B each having a substantially circular shape in a plan view, and a liquid crystal layer 11C interposed between the substrates 11A, 11B. Both the substrates 11A, 11B are bonded to each other with a sealing material 11D in a state where a gap corresponding to the thickness of the liquid crystal layer 11C is maintained.

The liquid crystal panel 11 includes a display area (active area) that is disposed on a middle side of a display screen, has a substantially circular shape, and displays an image; and a non-display area (non-active area) that is disposed on an outer peripheral side of the display screen, has a substantially annular shape so as to surround the display area, and displays no image. When light supplied from the backlight device 12 enters the liquid crystal panel 11 from the back side and exits from the front side, images are displayed in the display area of the liquid crystal panel 11. Polarizing plates 11E, 11F are attached to the outer surfaces of the substrates 11A, 11B, respectively.

One of the substrates 11A, 11B on the front side (front-surface side) is a color filter (hereinafter referred to as CF) substrate 11A, and the other of the substrates 11A, 11B on the back side (back-surface side) is an array substrate 11B. A section of the outer peripheral end of the array substrate 11B protrudes to the outside of the CF substrate 11A, and a terminal portion (not shown) is provided on the part. The terminal portion is connected to the terminal portion of a flexible substrate (not shown) for supplying various signals to the array substrate 11B.

The array substrate 11B includes thin film transistors (TFTs) as switching elements and pixel electrodes connected to the TFTs. The TFTs and the pixel electrodes are arranged in a matrix on the inner surface side of a glass support substrate (liquid crystal layer 11C side). On the array substrate 11B, source lines and gate lines are arranged so as to partition the TFTs or the like. A gate driver is mounted on the support substrate. Furthermore, on the array substrate 11B, common electrodes or the like facing the pixel electrodes are provided. The pixel electrodes and the common electrodes contain a transparent conductive film made of indium tin oxide (ITO) or zinc oxide (ZnO) or the like. For the active layer of the TFT, for example, an oxide semiconductor is used, but the material of the active layer is not limited thereto. The active layer may contain, for example, amorphous silicon or low temperature polysilicon or the like.

The CF substrate 11A includes CFs such as R (red), G (green), and B (blue) CFs arranged in a matrix on the inner surface side of the glass support substrate (liquid crystal layer 11C side). On the support substrate, a light shielding layer (black matrix) is formed so as to partition the CFs. An alignment film (not shown) for aligning liquid crystal molecules in the liquid crystal layer 11C is formed on the inner surface side of each of the substrates 11A, 11B.

Subsequently, the backlight device 12 will be described. The backlight device 12 has a substantially circular shape in a plan view as a whole as with the liquid crystal panel 11. As shown in FIGS. 1 and 2, the backlight device 12 includes a case 13, a light guide plate 14, optical sheets 15, a light reflection sheet 16, light emitting diodes (LEDs) 17 as a light source, and an LED substrate 50 (light source substrate) on which the LEDs 17 are mounted. The plan view here means a state viewed from the front side (light exiting surface side).

The case 13 is made of, for example, a synthetic resin molded article, and includes an annular wall portion 23 having a substantially annular shape so as to surround the light guide plate 14 or the like. The annular wall portion 23 is a plate-like portion having a predetermined thickness. The case 13 may include a bottom wall portion which covers the light reflection sheet 16. A panel fixing tape 20 for fixing the liquid crystal panel 11 to the backlight device 12 is attached to the annular wall portion 23. The panel fixing tape 20 includes a double-sided pressure-sensitive adhesive tape having a light shielding property, and has a substantially annular shape in a plan view.

The LED 17 has a configuration in which an LED chip (LED element) as a semiconductor light emitting element is sealed with a resin material on a substrate portion fixed to the plate surface of the LED substrate 50, and emits white light. As the LED chip, an LED chip which emits blue light in a single color is used. The resin material used for sealing the LED chip is a resin material in which a fluorescent material excited by blue light from the LED chip to emit a predetermined color (for example, yellow, green, red, etc.) is dispersedly blended. The external shape of the LED 17 is, for example, a substantially rectangular parallelepiped.

The LED 17 of the present embodiment is a so-called side-surface-emitting type LED, and a side surface adjacent to a mounting surface which is mounted on the LED substrate 50 is a light exiting surface 17A. The optical axis of the LED 17 extends parallel to the normal direction of the light exiting surface 17A. The "optical axis" here is an axis extending along the traveling direction of light emitted by the LED 17, having a predetermined light distribution portion, and having the highest light emission intensity.

The LED substrate 50 is a film-like (sheet-like) member having flexibility, and is mainly made of an insulating material such as a polyimide resin. The LED substrate 50 includes a wiring pattern (not shown) made of a copper foil or the like for feeding power to each LED 17. As shown in FIG. 2, the LED substrate 50 is attached to the case 13 and the light guide plate 14 in a state where a substrate fixing tape 21 attached to the back side of the LED substrate 50 is disposed therebetween.

The light guide plate 14 has a substantially circular shape in a plan view, and its outer circumference is surrounded by the annular wall portion 23. On the front side of the light guide plate 14, an optical sheet 15 and a liquid crystal panel 11 are disposed in this order. A section of the outer peripheral surface of the light guide plate 14 faces the light exiting surface 17A of the LED 17, and is a light entering surface 14C through which light from the LED 17 enters. The plate surface on the front side of the light guide plate 14 (any one of a pair of plate surfaces) is a light exiting surface 14A through which light that has entered the light guide plate 14 through the light entering surface 14C exits toward the liquid crystal panel 11 (and the optical sheet 15 side). The light exiting surface 14A has a substantially circular shape.

The plate surface on the back side of the light guide plate 14 (hereinafter referred to as a back surface 14B) is covered with the light reflection sheet 16. When the light emitted by the LED 17 enters the light guide plate through the light entering surface 14C, the light traveling through the light guide plate 14 is directed toward the front side to exit the light guide plate 14 to the outside through the light exiting surface 14A. The light that has exited to the outside and passed through the optical sheet 15 is supplied to the liquid crystal panel 11.

By reflecting light in the light guide plate 14 toward the front side, a light reflecting pattern including a light reflecting portion for promoting light emission from the light exiting surface 14A is formed on the back surface 14B of the light guide plate 14. The light reflecting portion is made of, for example, a light reflecting coating material such as white ink, or three-dimensional light reflecting obstacles such as an emboss pattern. A large number of micro dots including the light reflecting portion are gathered to form the light reflecting pattern. The higher the density (distribution density) of the light reflecting portion in the light reflecting pattern is, the higher a light reflecting function provided by the light reflecting pattern is. By appropriately setting such an aspect of the light reflecting pattern, the uniformity (luminance uniformity) of the light exiting through the light exiting surface 14A can be further improved.

The optical sheet 15 includes a laminate of sheets, and is stacked on the front side of the light guide plate 14 so as to cover the light exiting surface 14A. The optical sheet 15 has a function of giving an optical action while the light passed therethrough on the light that has exited from the light guide plate 14. The optical sheet 15 includes a diffusion sheet 15A and two prism sheets 15B, 15C. The optical sheet 15 may further include a reflective polarizing sheet or the like. As with the light guide plate 14 or the like, the optical sheet 15 has a substantially circular shape in a plan view.

As with the light guide plate 14 or the like, the light reflection sheet 16 has a substantially circular shape in a plan view. The light reflection sheet 16 includes, for example, a white synthetic resin sheet substrate (for example, a white foamed polyethylene terephthalate sheet), and has a surface having excellent light reflectivity. The light reflection sheet 16 is set so as to have a size entirely covering the back surface 14B of the light guide plate 14. The light emitted to the outside of the back surface 14B of the light guide plate 14 is reflected by the light reflection sheet 16, is returned into the light guide plate again, and rises toward the front side. The light reflection sheet 16 is, for example, fixed to the back surface 14B of the light guide plate 14 by a sheet fixing tape (not shown).

Next, the disposition aspect and electrical configuration of the LED 17 will be described. As shown in FIG. 2, in the present embodiment, the light guide plate 14 has a pair of light entering surfaces 14C. The light entering surfaces 14C are disposed on opposite sides from each other relative to the center C1 of the light exiting surface 14A. In the following description, one of the pair of light entering surfaces 14C is referred to as a light entering surface 31 (first light entering surface), and the other light entering surface is referred to as a light entering surface 32 (second light entering surface). Each of the light entering surfaces 31, 32 is a section of the outer peripheral surface of the light guide plate 14, and is a flat surface.

The LED 17 is disposed on each of the pair of light entering surfaces 31, 32. In the following description, among the pair of LEDs 17, an LED disposed opposite the light entering surface 31 is referred to as an LED 41 (first light source) and an LED disposed opposite the light entering surface 32 is referred to as an LED 42 (second light source). In the present embodiment, an angle D1 between a straight line L7 that connects the center C1 of the light exiting surface 14A to the LED 41 and a straight line L8 that connects the center C1 of the light exiting surface 14A to the LED 42 is set to 180°, for example, but the angle D1 is not limited thereto. The LED 41 and the LED 42 may be disposed with the center C1 therebetween, and the angle D1 is preferably set within a range of 140° to 220°, for example.

The annular wall portion 23 has an annular shape so as to surround the outer circumference of the light guide plate 14 and the LEDs 41, 42, and a portion corresponding to the LED 41 is a linear portion 24 formed in a linear form. Specifically, a disposing area where the LED 41 (LED 42) can be disposed is set between the light entering surface 31 (or the light entering surface 32) and the annular wall portion 23.

On the other hand, a portion of the outer peripheral surface of the light guide plate 14 other than the light entering surfaces 31, 32 substantially tightly abuts on the annular wall portion 23. The outer peripheral surface of the light guide plate 14 is partitioned into an LED facing portion (light source facing portion) facing the LED 17 and an LED non-facing portion not facing the LED 17. The LED facing portion constitutes the light entering surfaces 31, 32 through which the light from the LED 17 directly enters. On the other hand, the LED non-facing portion (a portion between the light entering surface 31 and the light entering surface 32 on the outer peripheral surface of the light guide plate 14) is a non-light entering surface through which the light from the LED 17 is less likely to directly enter. In other words, an area between the LED non-facing portion and the annular wall portion 23 on the outer peripheral surface of the light guide plate 14 is a light source non-disposing area B1 in which the LED 17 is not disposed.

In the present embodiment, the LED non-facing portion is described as the "non-light entering surface", but it does not mean that no light enters. For example, when light leaked to the outside once from the non-light entering surface is reflected by the inner surface of the case, or the like, and returned, the returned light may enter the non-light entering surface.

The annular wall portion 23 is slightly larger than a circular display area A1 (active area represented by one-dot chain line) of the liquid crystal panel 11 in a plan view. As shown in FIG. 2, the outer shape of the liquid crystal panel 11 is a circular shape having a size that surrounds the linear portion 24 of the annular wall portion 23.

Figure 4:
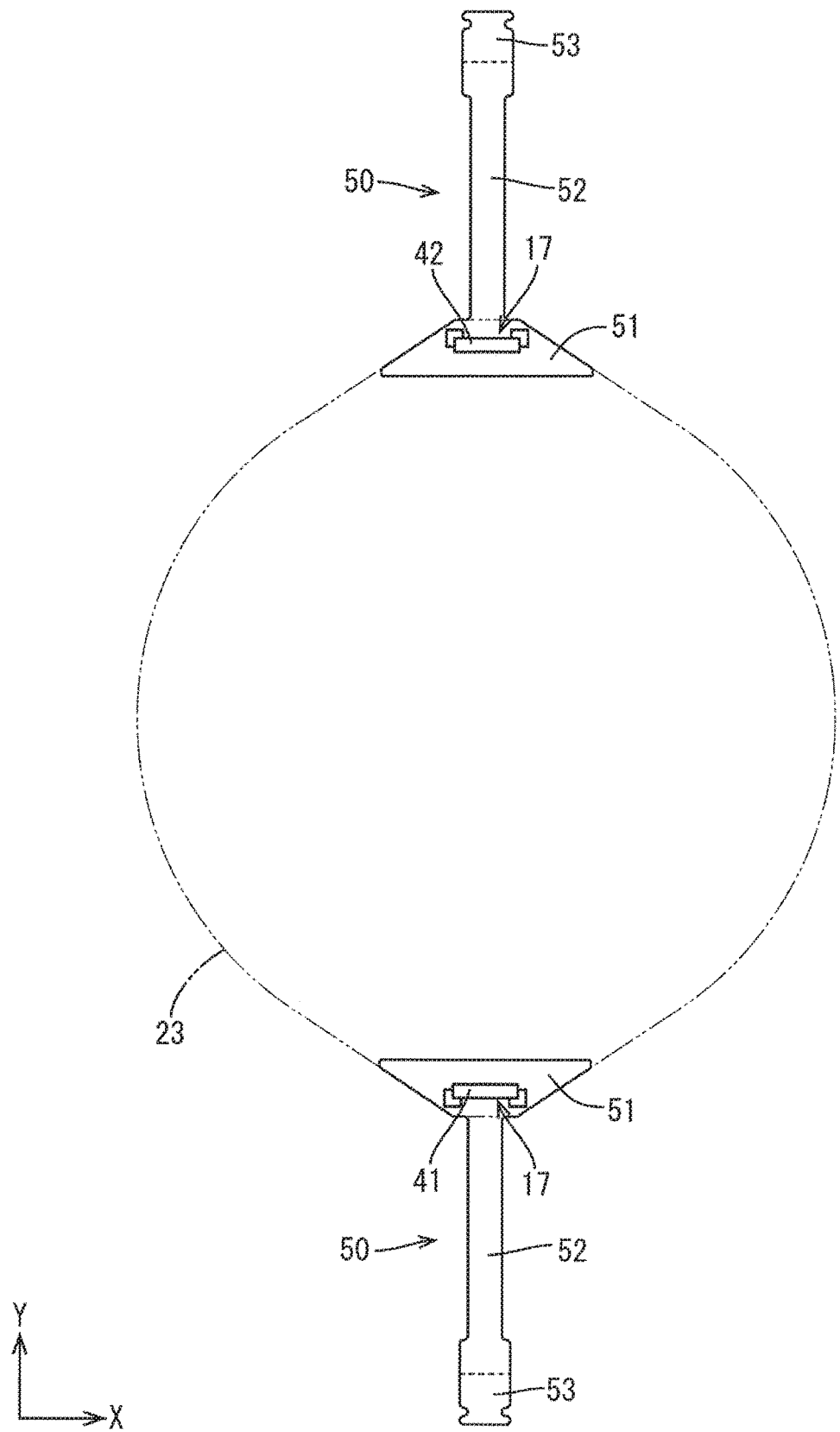
FIG. 4 is a plan view showing an LED substrate according to the first embodiment.

As shown in FIG. 4, the LED substrate 50 includes a main body portion 51 on which the LED 17 (the LED 41 or the LED 42) is mounted by soldering or the like, and a belt-like extracted portion 52 extracted to the outside from the main body portion 51. A terminal portion 53 connected to the wiring pattern is provided at the tip of the extracted portion 52. The terminal portion 53 is attached to a power supply connector of an LED drive circuit substrate (not shown) included in the backlight device 12. The LED substrate 50 is provided on each of the LED 41 and the LED 42.

Next, effects of the present embodiment will be described. Conventionally, a backlight device having a shape closer to a circular shape may be required from the viewpoint of designability or the like. In such a backlight device, a light guide plate having a substantially circular shape is used. If a section of the outer peripheral surface of a light guide plate 64 having a substantially circular shape in a backlight device 62 is a light entering surface 64C as shown in Comparative Example of FIG. 3, light is less likely to reach a portion 64E adjacent to the light entering surface 64C on the outer peripheral end portion of the light guide plate 64, and the portion 64E is apt to be a dark portion.

Here, if the LEDs 17 are arranged in a linear form so as to face the light entering surface 64C, the emitting range of light can be further widened, and the dark portion can be reduced. However, when the LEDs 17 are arranged in a linear form, a section of an annular wall portion 63 covering the LEDs 17 needs to be a linear portion 63A, which makes it difficult to bring the shape of the annular wall portion 63 (eventually, the backlight device) close to a circular shape.

Figure 3:
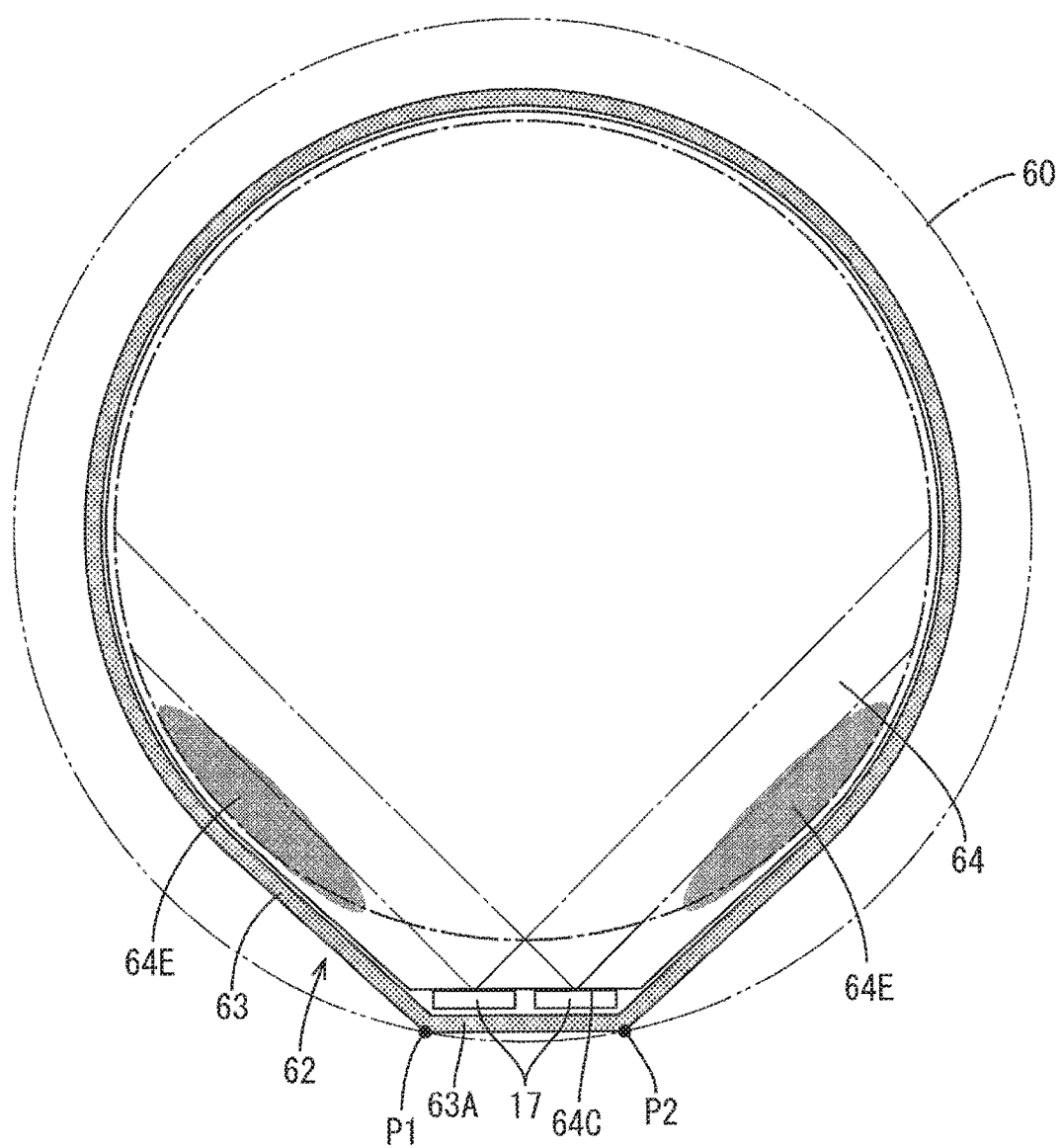
FIG. 3 is a plan view showing Comparative Example according to the first embodiment.

As shown by a two-dot chain line in FIG. 3, when the liquid crystal display device 60 is formed into a circular shape, the outer shape of the liquid crystal display device 60 of the linear portion 63A needs to be formed into a circular shape passing through at least two points P1, P2 at both ends of the linear portion 63A. That is, the larger the length of the linear portion 63A is, the larger the outer shape of the liquid crystal display device 60 (for example, the outer shape of the liquid crystal panel) needs to be.

As in the present embodiment, in a configuration in which the LED 41 (light entering surface 31) and the LED 42 (light entering surface 32) are disposed with the center C1 of the light exiting surface 14A (light guide plate 14) interposed therebetween, light from one light entering surface 32 reaches a portion adjacent to the other light entering surface 32 on the outer peripheral end portion of the light guide plate 14, whereby the dark portion can be reduced. As a result, it is also possible to eliminate the configuration in which (for example, two) LEDs 17 are arranged in a linear form, and to reduce the number of the LEDs 17 arranged in a linear form. This makes it possible to reduce the length of the portion to be linearized (linear portion 24) on the annular wall portion 23, whereby the annular wall portion 23 is allowed to have a shape closer to a circular shape.

Figure 5:
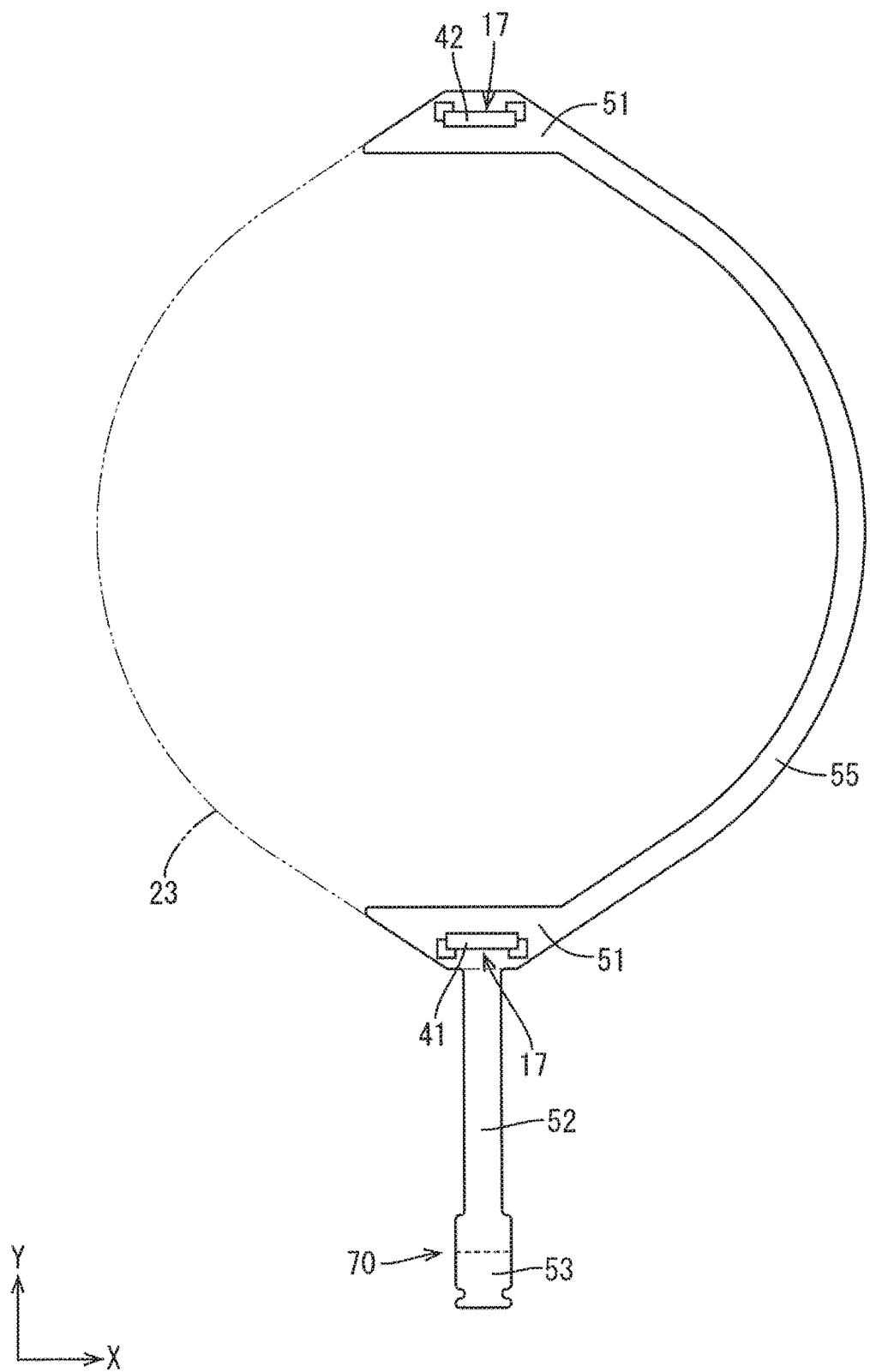
FIG. 5 is a plan view showing a first modified example of the LED substrate according to the first embodiment.
Figure 7:
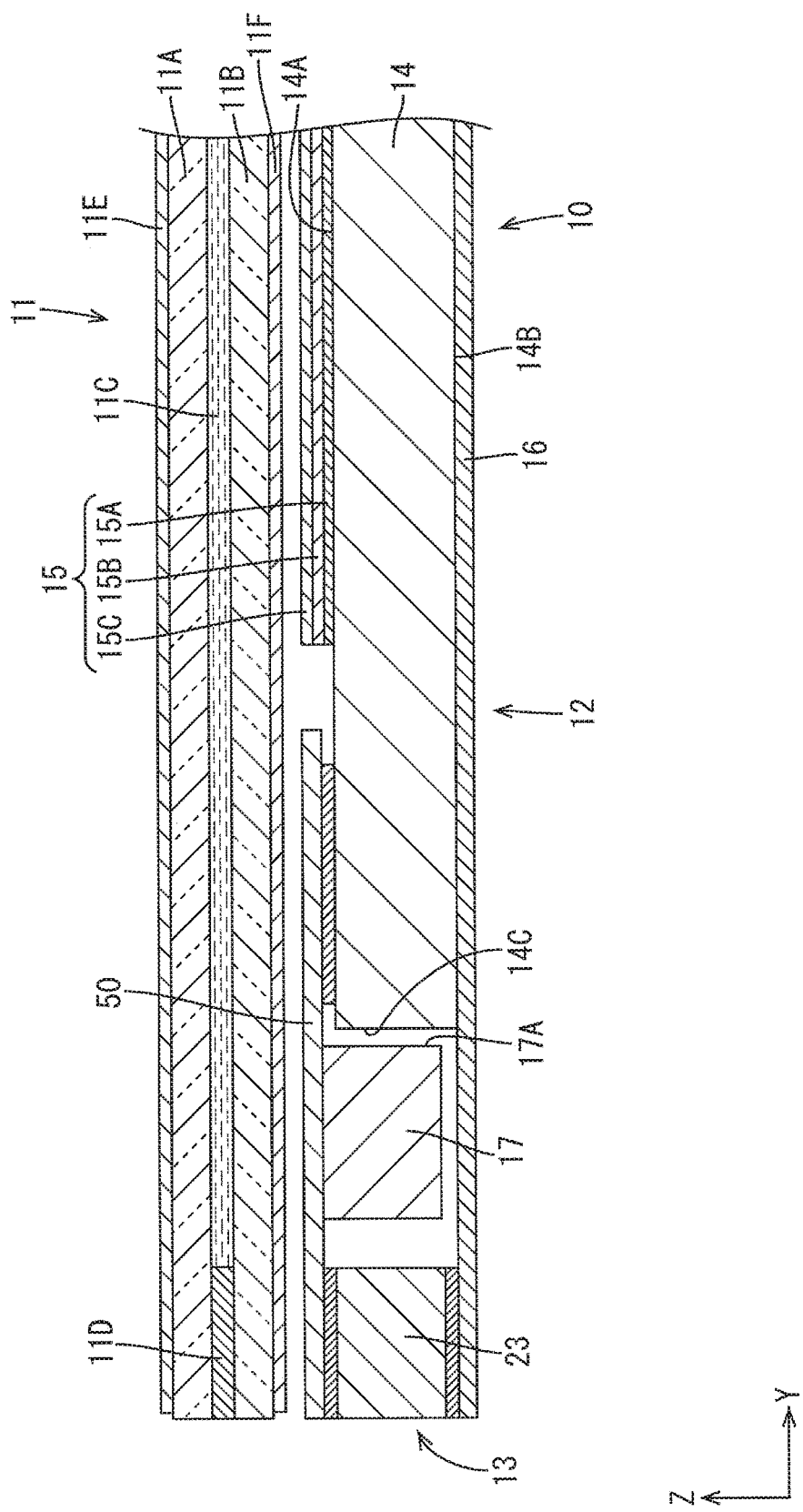
FIG. 7 is a cross-sectional view showing a modified example of the backlight device.

In the present embodiment (embodiments 2 to 8 described later), as shown in FIG. 7, the LED substrate 50 may be disposed on the front side of the LED 17. In the present embodiment, the configuration in which the LED substrate 50 is provided on each of the LEDs 41, 42 is exemplified, but the present invention is not limited thereto. As shown in FIG. 5, an LED substrate 70 in which a pair of main body portions 51, 51 are connected by a connecting portion 55 may be provided.

Figure 6:
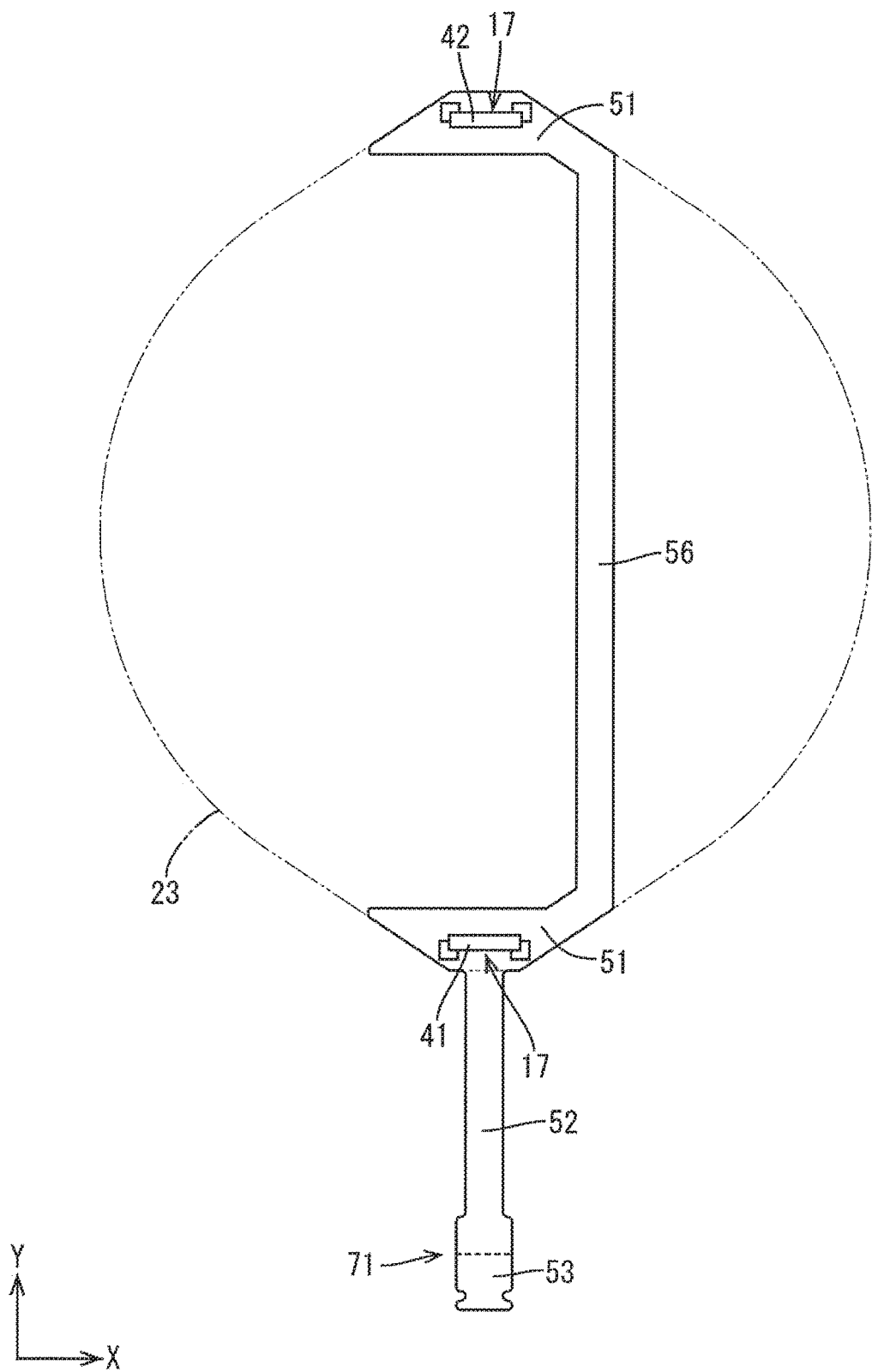
FIG. 6 is a plan view showing a second modified example 2 of the LED substrate according to the first embodiment.

A wiring pattern (not shown) is provided in the connecting portion 55, and a pair of LEDs 17, 17 are connected in series or in parallel. Such a configuration makes it possible to reduce the number of the terminal portions 53 as compared with the configuration in FIG. 4. The connecting portion 55 has a substantially arc shape so as to be overlapped with the non-display area of the liquid crystal display device 10. When the LED substrate is disposed on the back side of the LED 17, as shown in FIG. 6, an LED substrate 71 may be provided, which includes a pair of main body portions 51, 51 connected by a linear connecting portion 56.

Second Embodiment

Next, a second embodiment of the present invention will be described with reference to FIGS. 8, 9. In a backlight device 112 of the present embodiment, the configuration of a light guide plate is different from that of the above embodiment. The same portions as those of the above embodiment are denoted by the same reference numerals, and redundant description is not repeated.

Figure 8:
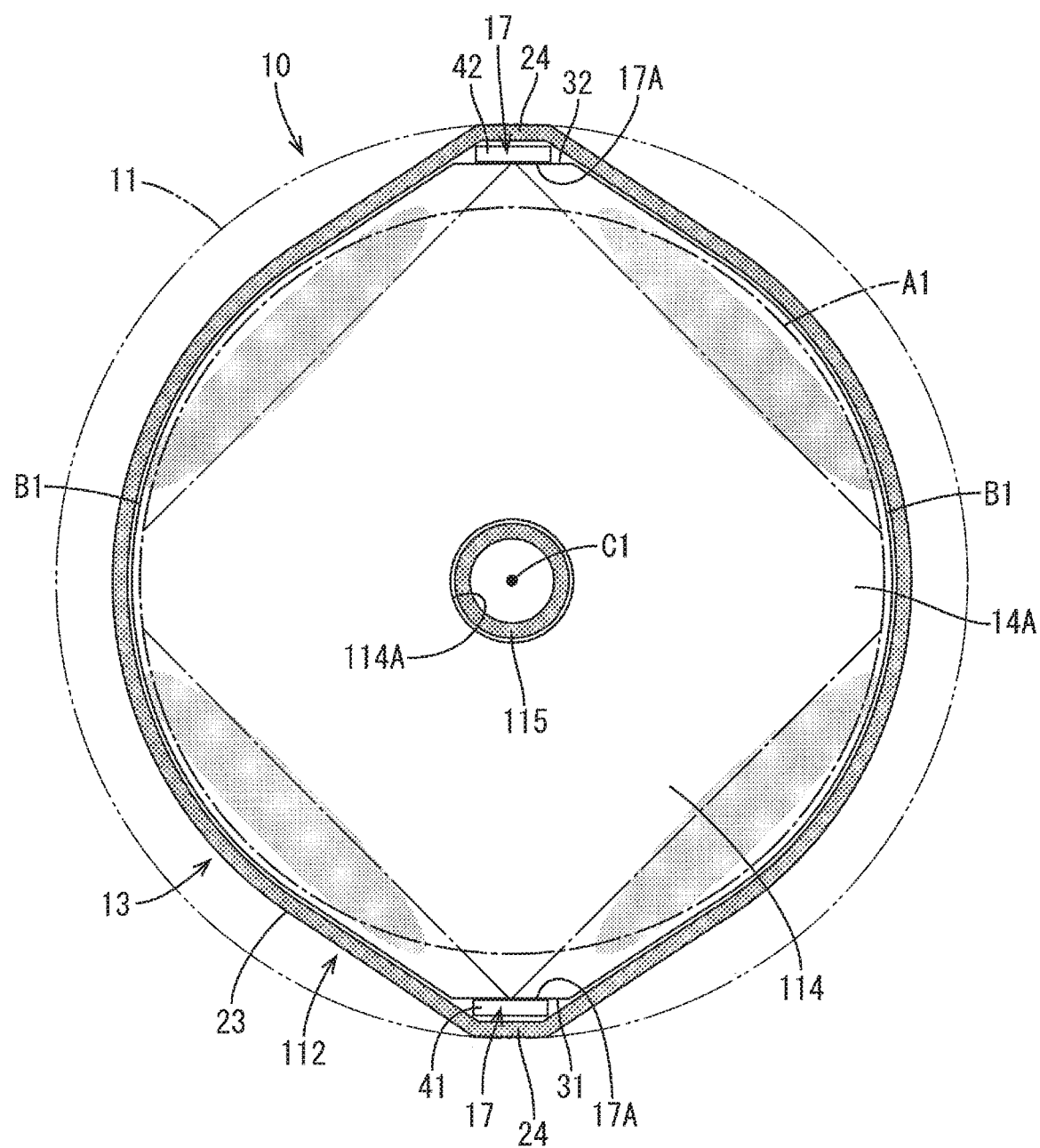
FIG. 8 is a plan view showing a backlight device according to a second embodiment.
Figure 9:
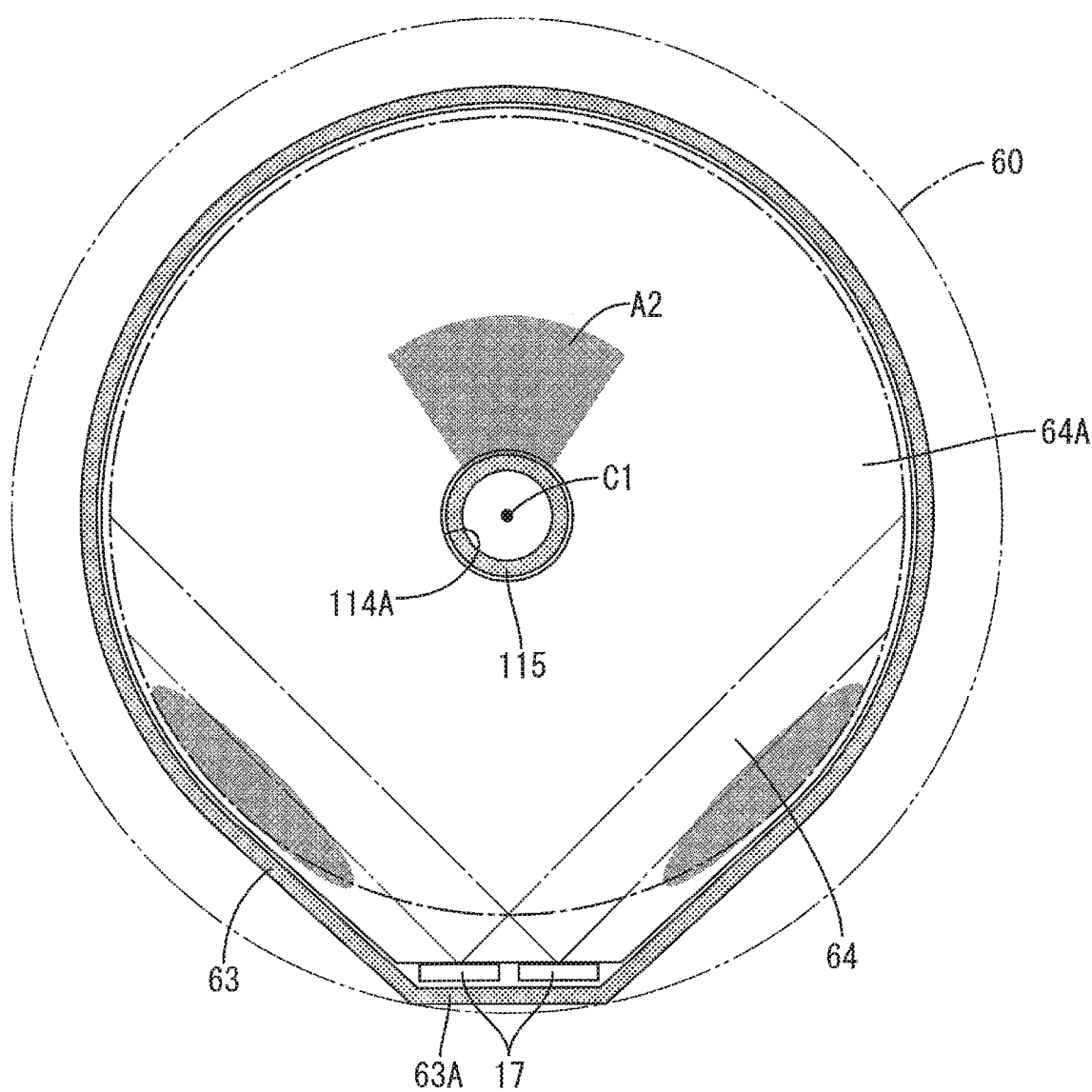
FIG. 9 is a plan view showing Comparative Example according to the second embodiment.

In the present embodiment, as shown in FIG. 8, a through hole 114A having a circular shape is formed at the center C1 (the center of the backlight device 112) of a light exiting surface 14A in a light guide plate 114. The through hole 114A is formed so as to penetrate the light guide plate 114 in the thickness direction. Into the through hole 114A, a functional component constituting a liquid crystal display device 10 is inserted. Examples of such a functional component include, but are not limited to, a component involving the driving of a needle of a clock or meter provided on the display surface of a liquid crystal display (for example, a shaft member connecting the needle and a driving component).

A cylindrical light blocking member 115 is provided along the inner surface of the through hole 114A. Such a light blocking member 115 is attached to the surface of a light reflection sheet 16, for example. LEDs 41, 42 are disposed so as to face each other with the light blocking member 115 interposed therebetween.

The present embodiment makes it possible to insert the functional component into the through hole 114A. The light blocking member 115 is provided, which makes it possible to suppress a situation where light leaks from the LEDs 41, 42 to the outside through the through hole 114A. As shown in FIG. 9, if an LED 17 is disposed only on one side of a light guide plate 64 in a configuration including the light blocking member 115, the light from the LED 17 is less likely to reach a portion A2 far from the LED 17 in the circumference of the light blocking member 115 on a light exiting surface 64A, and the portion A2 is apt to become a dark portion. In this regard, in the present embodiment, the LEDs 41, 42 are disposed so as to face each other with the light blocking member 115 interposed therebetween, which makes it possible to suppress the situation where the circumference of the light blocking member 115 on the light exiting surface 14A becomes the dark portion.

Third Embodiment

Next, a third embodiment of the present invention will be described with reference to FIG. 10. In a backlight device 212 of the present embodiment, the configuration of LEDs is different from that of the second embodiment. The same portions as those of the above embodiment are denoted by the same reference numerals, and redundant description is not repeated.

Figure 10:
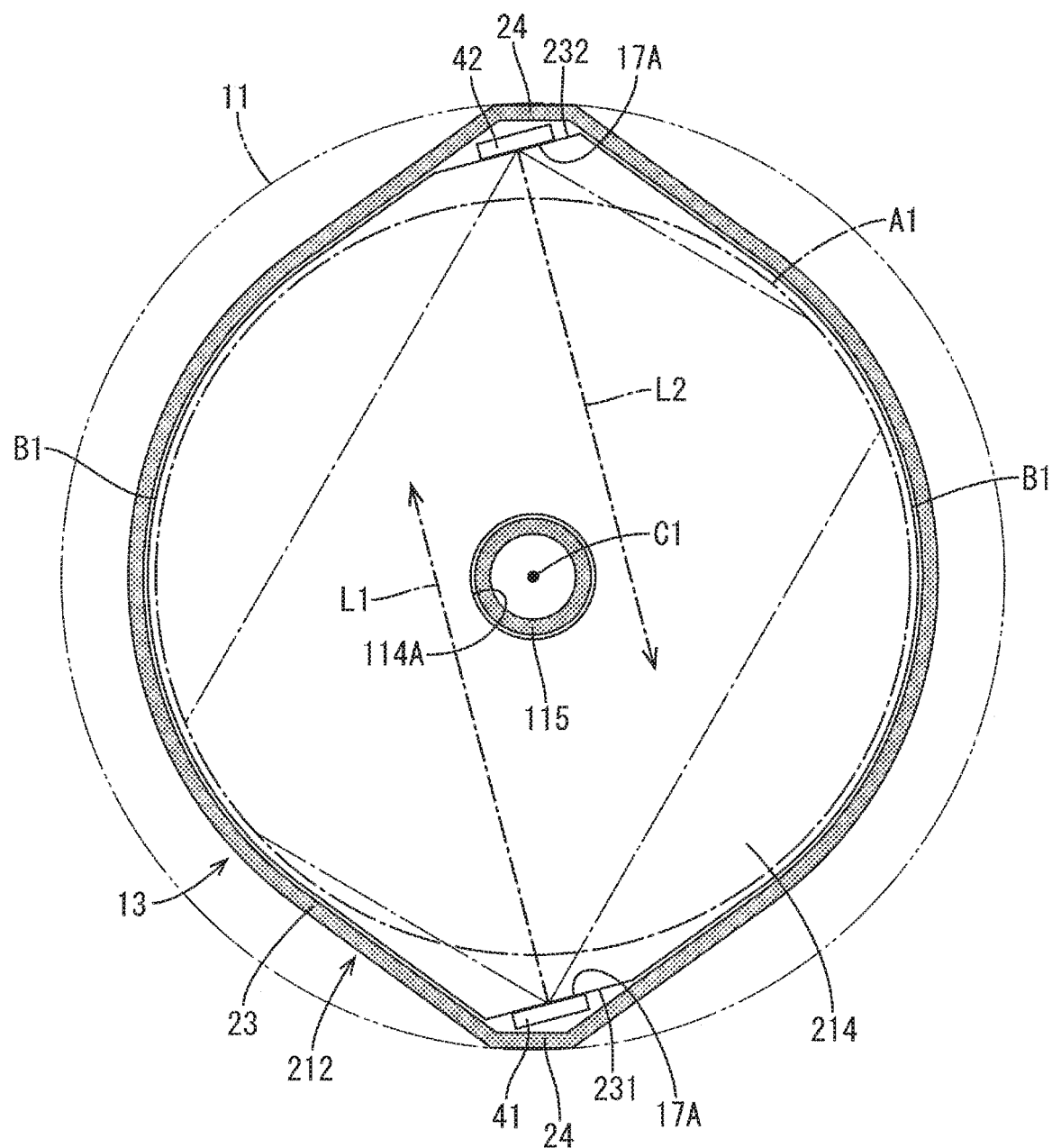
FIG. 10 is a plan view showing a backlight device according to a third embodiment.

In the present embodiment, as shown in FIG. 10, optical axes L1, L2 of LEDs 41, 42 are disposed so as not to be overlapped with a light blocking member 115. When light emitted by the LED is reflected by the light blocking member 115, the circumference of the light blocking member 115 is bright, which may disadvantageously cause luminance unevenness. In the present embodiment, the optical axes L1, L2 of the LEDs 41, 42 are disposed so as not to be overlapped with the light blocking member 115, whereby the amount of light directly directed to the light blocking member 115 can be reduced, thereby allowing the luminance unevenness to be suppressed.

In the present embodiment, the directions of respective light exiting surfaces 17A of the LEDs 41, 42 are set such that the optical axes L1, L2 are not overlapped with the light blocking member 115. Light entering surfaces 231, 232 of a light guide plate 214 are provided so as to face the respective light exiting surfaces 17A, 17A.

Fourth Embodiment

Next, a fourth embodiment of the present invention will be described with reference to FIGS. 11 to 16. In a backlight device 312 of the present embodiment, the configuration of LEDs is different from that of the above embodiment. The same portions as those of the above embodiment are denoted by the same reference numerals, and redundant description is not repeated.

Figure 11:
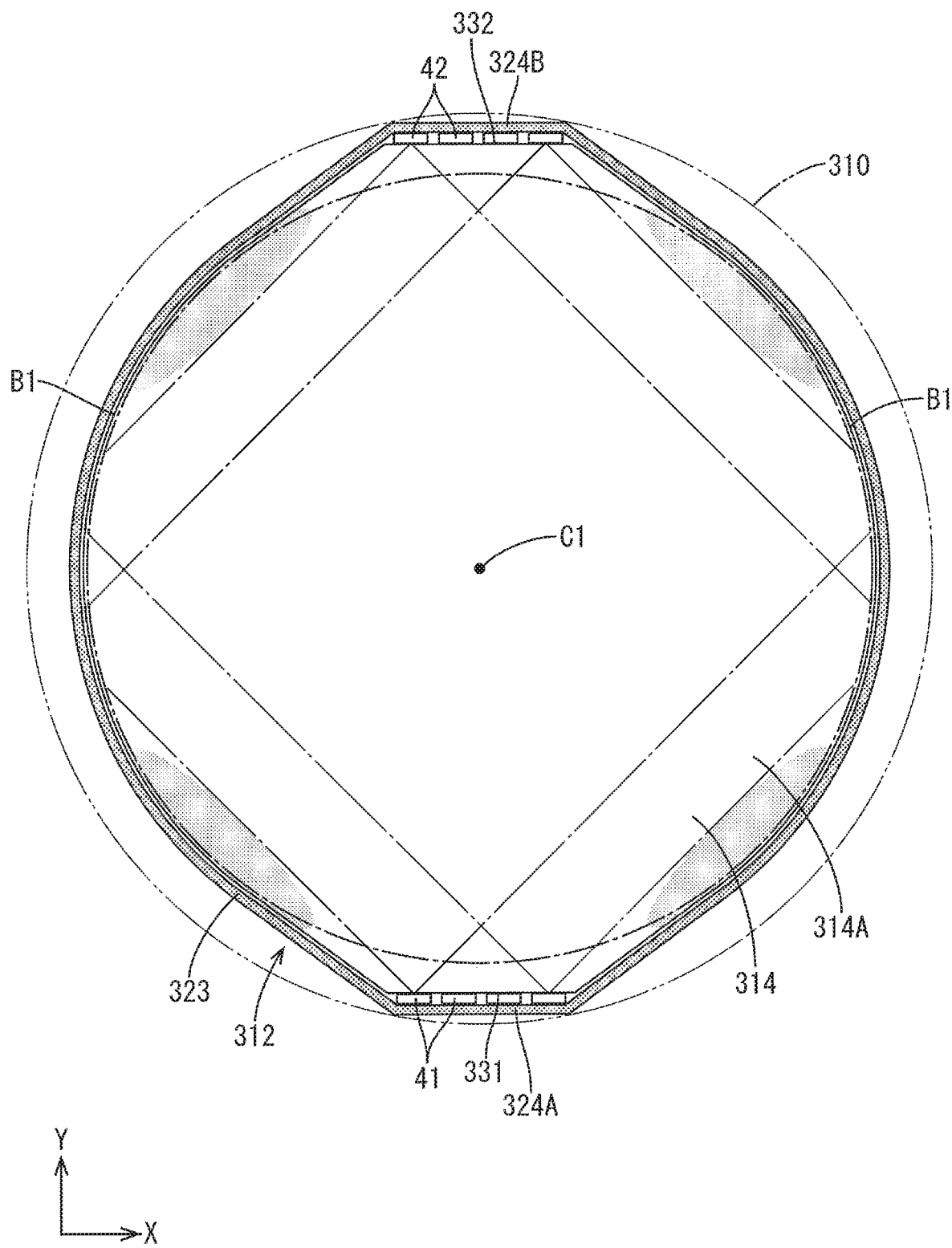
FIG. 11 is a plan view showing a backlight device according to a fourth embodiment.

In the present embodiment, as shown in FIG. 11, (four in the present embodiment) LEDs 41 are arranged in a linear form so as to face a light entering surface 331 of a light guide plate 314. Multiple (four in the present embodiment) LEDs 42 are arranged in a linear form so as to face a light entering surface 332 of the light guide plate 314. The LEDs 41 are arranged adjacent to each other along a linear portion 324A of an annular wall portion 323, and the LEDs 42 are arranged adjacent to each other along a linear portion 324B of the annular wall portion 323. Such a configuration allows light to be emitted by a group of LEDs in a wider range, which allows luminance unevenness to be further reduced. That is, in the present embodiment, the LEDs 41 (a group of LEDs 41) and LEDs 42 (a group of LEDs 42) are disposed with the center C1 of the light entering surface 314A of the light guide plate 314 interposed therebetween.

Figure 12:
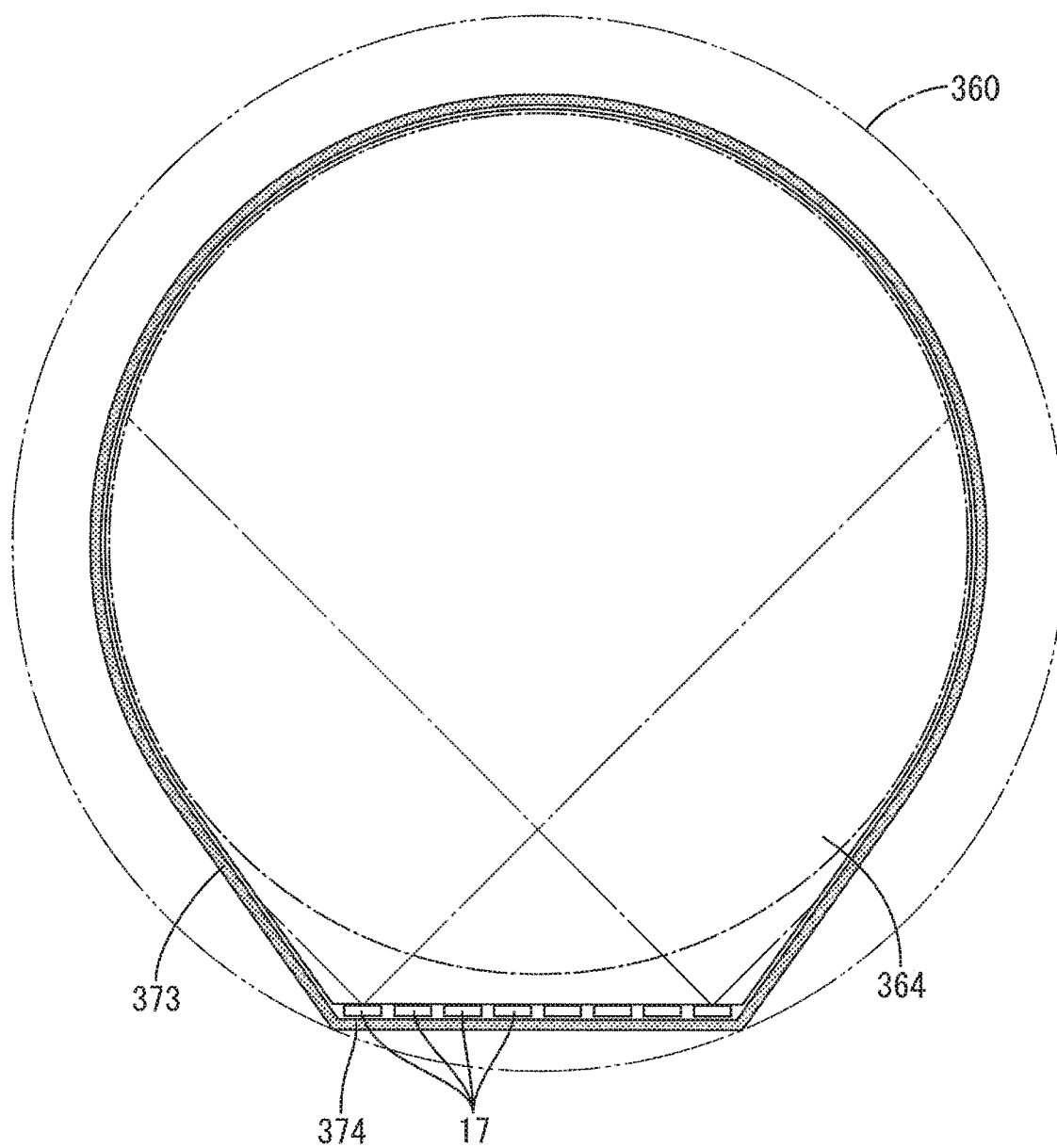
FIG. 12 is a plan view showing Comparative Example 1 according to the fourth embodiment.
Figure 13:
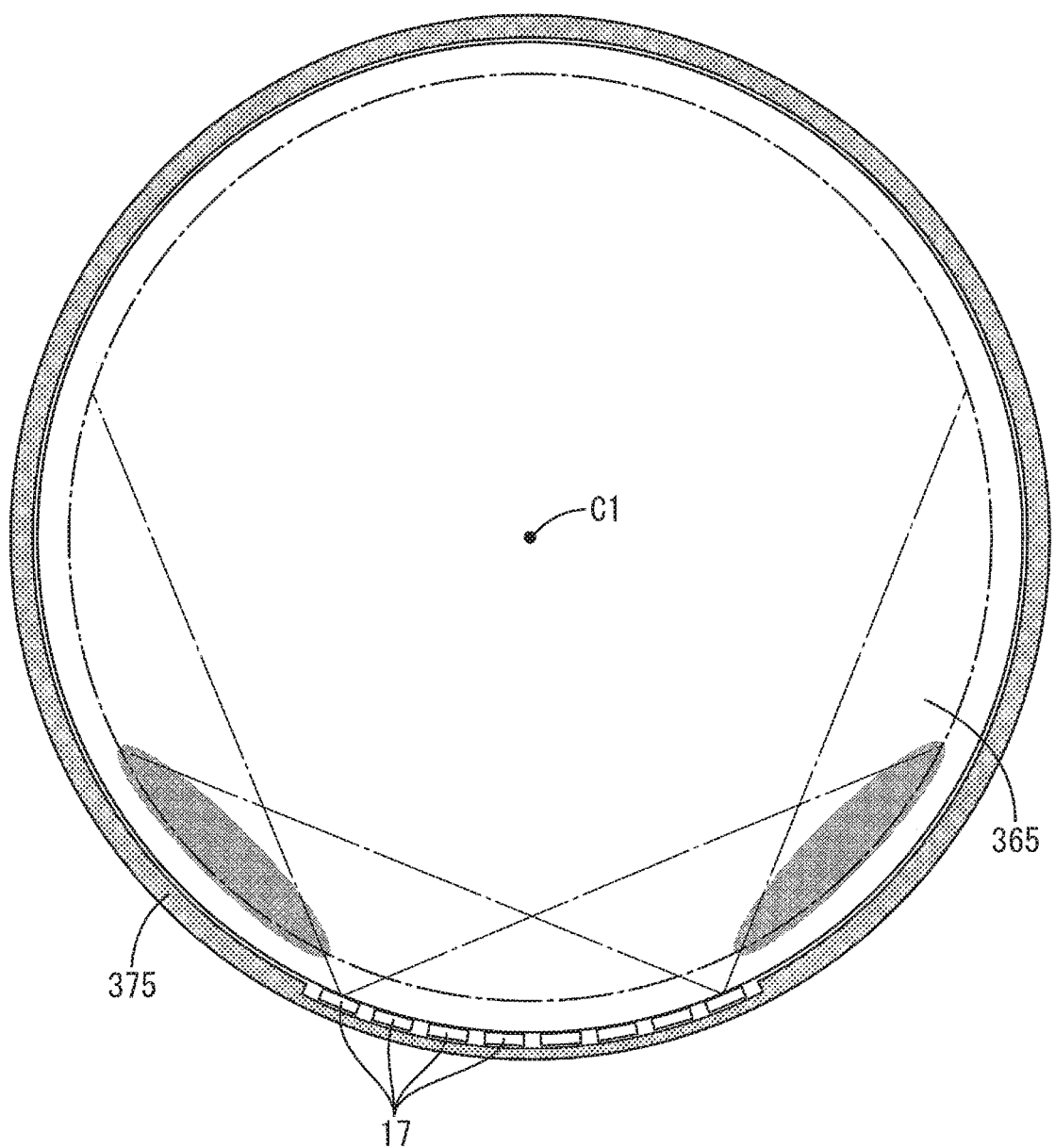
FIG. 13 is a plan view showing Comparative Example 2 according to the fourth embodiment.

As shown in Comparative Example in FIG. 12, when the LEDs 17 are disposed only on one side of a light guide plate 364, a linear portion 374 of an annular wall portion 373 is long, whereby the outer shape of a liquid crystal display device 360 is large. As shown in Comparative Example in FIG. 13, the LEDs 17 are arranged in a curved form (arc form), which makes it possible to form an annular wall portion 375 into a circular shape, thereby allowing a situation where the outer shape of the liquid crystal display device is large to be suppressed. However, when the LEDs 17 are arranged in a curved form (arc form), light emitted by the LED 17 is likely to be directed toward the center C1 of a light guide plate 365, and the outer peripheral end portion of the light guide plate 365 is apt to become a dark portion, thereby causing luminance unevenness to occur.

As in the present embodiment, the pair of groups of LEDs (the group of LEDs 41 and the group of LEDs 42) are disposed so as to face each other, which allows the shape of the annular wall portion 323 to be brought close to a circular shape as compared with the configuration in FIG. 12, and allows the outer shape of a liquid crystal display device 310 to be reduced. As compared with the configuration in FIG. 13, it is possible to suppress a situation where luminance unevenness occurs.

Figure 14:
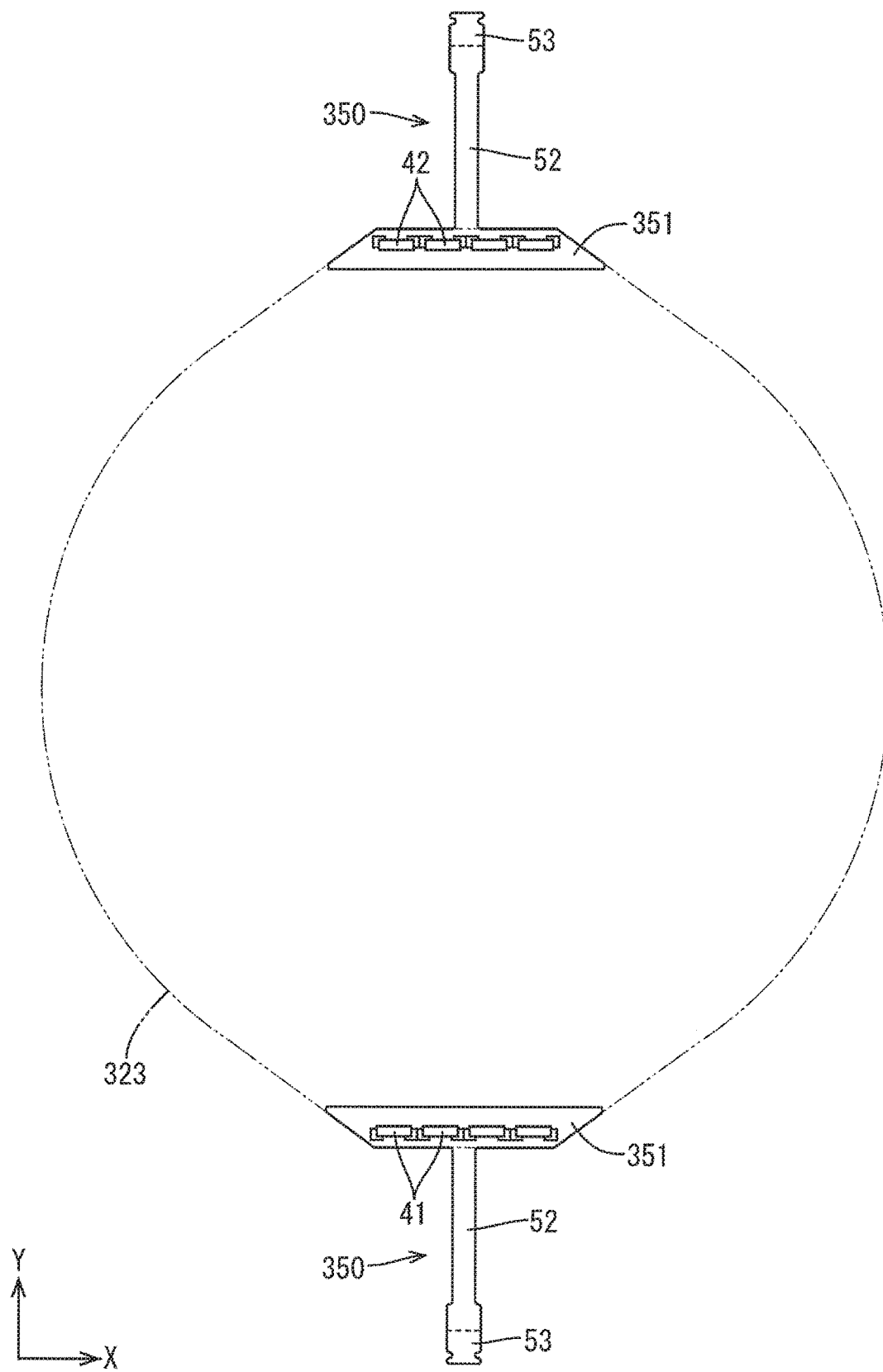
FIG. 14 is a plan view showing an LED substrate according to the fourth embodiment.

In the present embodiment, as shown in FIG. 14, an LED substrate 350 is provided so as to correspond to each of the group of LEDs 41 and the group of LEDs 42. The LED substrate 350 includes a longitudinal main body portion 351 on which the group of LEDs 41 or the group of LEDs 42 is mounted. In the present embodiment, the groups of LEDs are arranged in two places in a concentrated manner. This makes it possible to reduce the extension length of the LED substrate as compared with a configuration in which LEDs are evenly disposed over the entire circumference.

Figure 15:
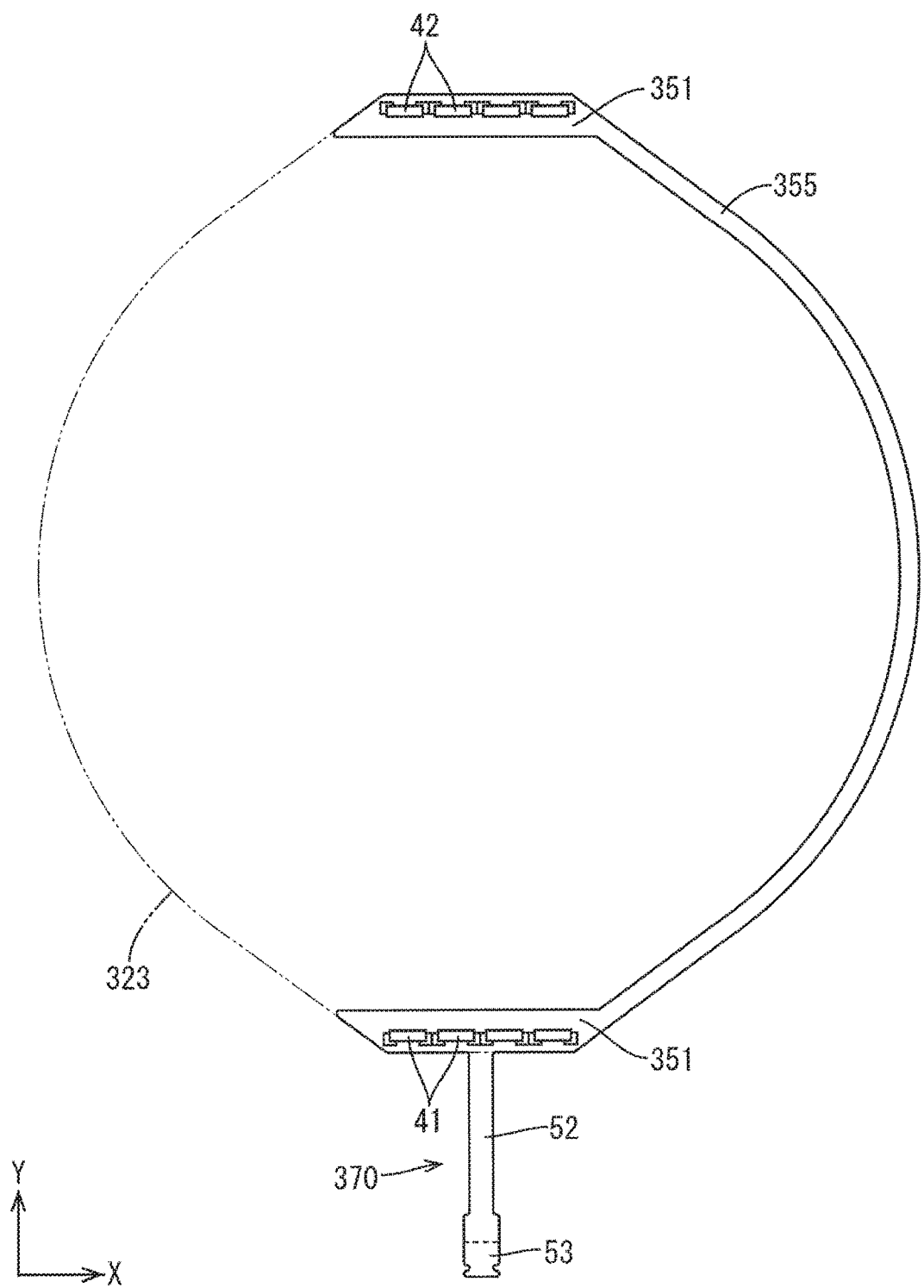
FIG. 15 is a plan view showing a first modified example of the LED substrate according to the fourth embodiment.

In the present embodiment, the configuration in which the LED substrate 350 is provided on each of the group of LEDs 41 and the group of LEDs 42 is exemplified, but the present invention is not limited thereto. As shown in FIG. 15, an LED substrate 370 in which a pair of main body portions 351, 351 are connected by a curved connecting portion 355 may be provided.

Figure 16:
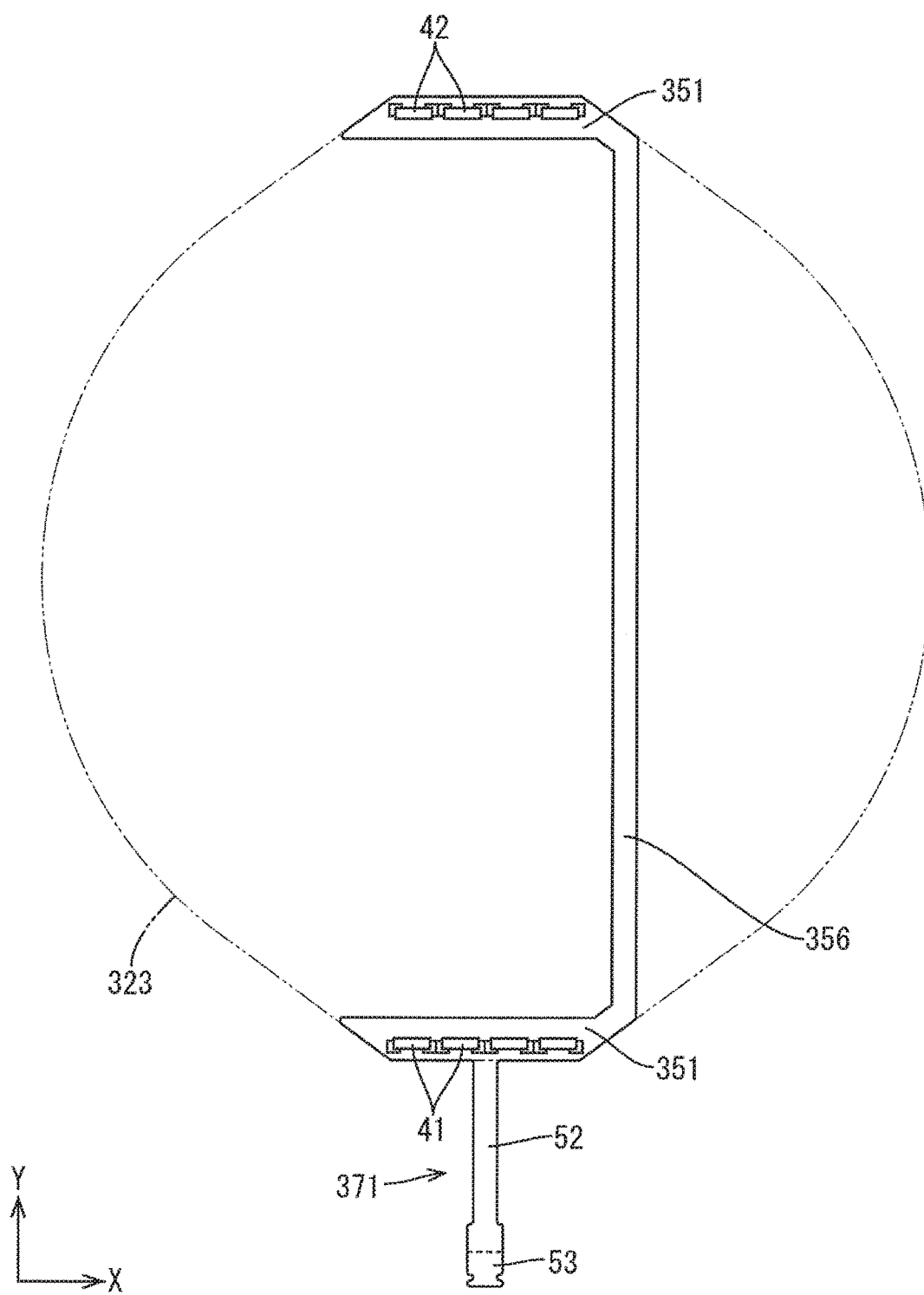
FIG. 16 is a plan view showing a modified example 2 of the LED substrate according to the fourth embodiment.

When the LED substrate is disposed on the back side of the LEDs 41, 42, an LED substrate 371 in which the pair of main body portions 351, 351 are connected by a linear connecting portion 356 as shown in FIG. 16 may be provided.

In the present embodiment, the LEDs 41 (or the LEDs 42) may be connected in series or in parallel. In the case of the configuration in which the pair of main body portions 351, 351 are connected by the connecting portion as shown in FIGS. 15, 16, the groups of LEDs connected in series (the group of LEDs 41 or the group of LEDs 42) may be connected in parallel.

Fifth Embodiment

Next, a fifth embodiment of the present invention will be described with reference to FIG. 17. In a backlight device 412 of the present embodiment, the configuration of LEDs is different from that of the above embodiment. The same portions as those of the above embodiment are denoted by the same reference numerals, and redundant description is not repeated.

Figure 17:
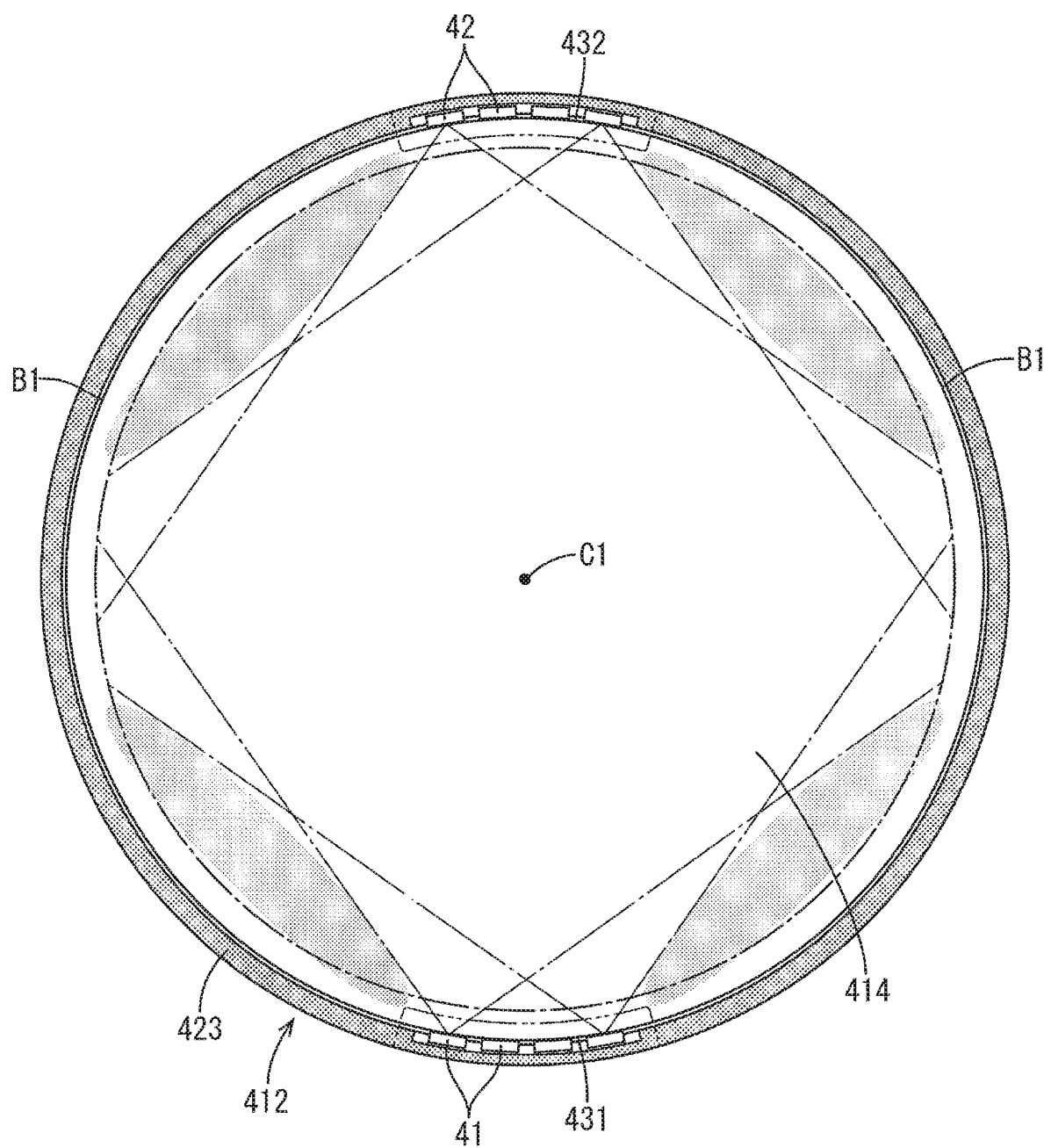
FIG. 17 is a plan view showing a backlight device according to a fifth embodiment.

In the present embodiment, as shown in FIG. 17, a light guide plate 414 and an annular wall portion 423 each have a circular shape, and light entering surfaces 431, 432 of the light guide plate 414 each have an arc shape (curved shape). Multiple LEDs 41 are disposed adjacent to each other, and the LEDs 41 are arranged in an arc form (curved form) along the shape of the light entering surface 431. Multiple LEDs 42 are disposed adjacent to each other, and the LEDs 42 are arranged in an arc form (curved form) along the shape of the light entering surface 432. In other words, the LEDs 41 (and the LEDs 42) are arranged in an arc form around the center C1 of the light guide plate 414.

According to the present embodiment, by arranging the LEDs 41, 42, the irradiation range of light that has entered the light guide plate 414 through the light entering surfaces 431, 432 can be further widened, and luminance unevenness can be further reduced. If the LEDs 41, 42 are arranged in a curved form, the shape of the annular wall portion 423 is likely to be brought close to a circular shape as compared with a configuration in which the respective LEDs are arranged in a linear form. When the LEDs adjacent to each other are arranged in a curved form, light emitted by each LED is likely to be directed toward the center C1 of the light exiting surface, whereby the outer peripheral end portion of the light guide plate 414 is apt to become a dark portion. However, in the above-described configuration, a portion that light emitted by one group of LEDs 41 is less likely to reach can be irradiated with light emitted by the other group of LEDs 42, whereby the dark portion is less likely to occur even when the LEDs are arranged in a curved form.

Sixth Embodiment

Next, a sixth embodiment of the present invention will be described with reference to FIG. 18. In a backlight device 512 of the present embodiment, the configurations of a light guide plate and annular wall portion are different from those of the above embodiment. The same portions as those of the above embodiment are denoted by the same reference numerals, and redundant description is not repeated.

Figure 18:
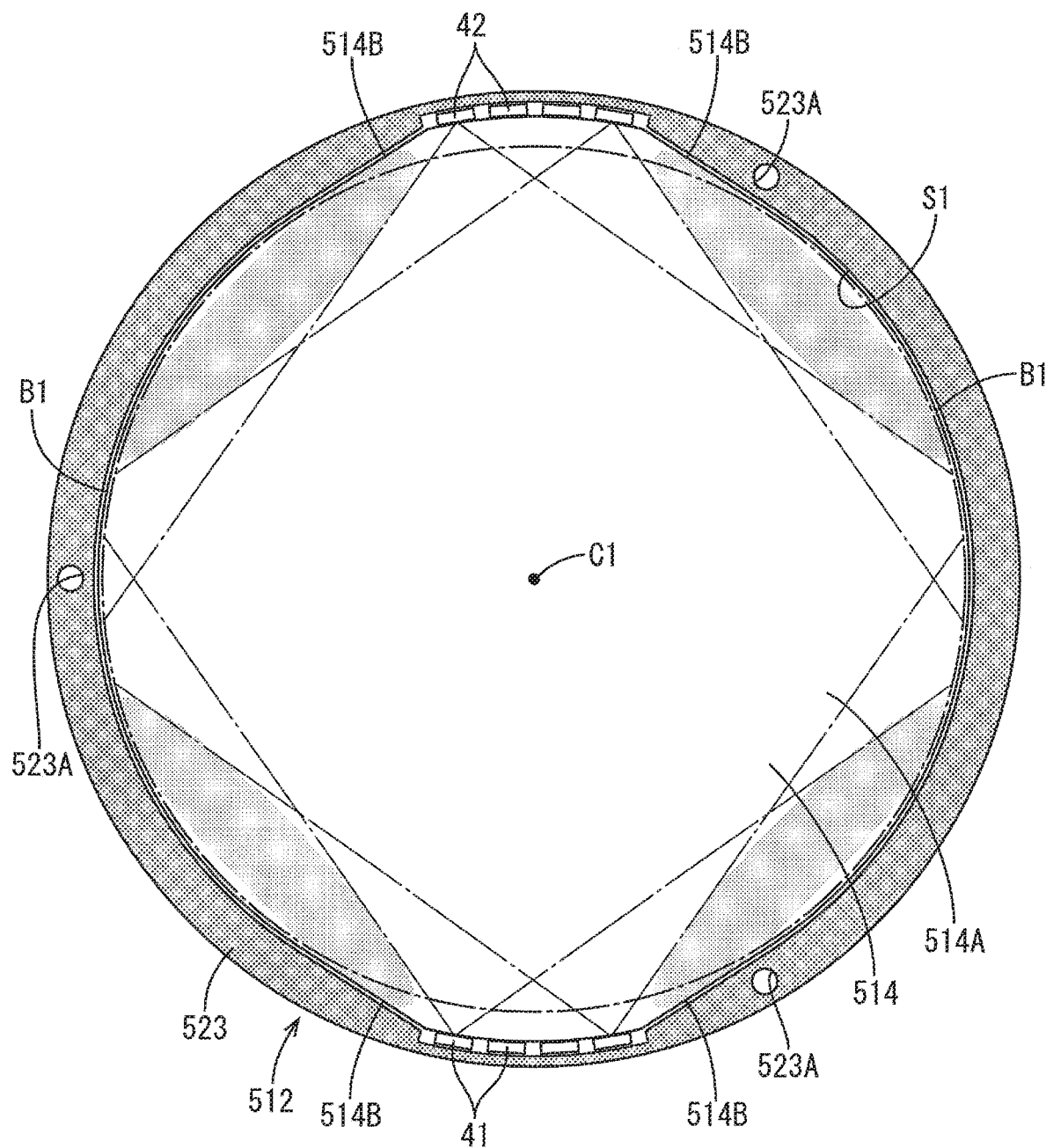
FIG. 18 is a plan view showing a backlight device according to a sixth embodiment.

As shown in FIG. 18, a light guide plate 514 of the present embodiment includes a linear portion 514B being a linear section of its outer peripheral surface. The inner peripheral surface of an annular wall portion 523 has a shape following the outer peripheral shape of the light guide plate 514, and the light guide plate 514 is fitted into an inner space S1 of the annular wall portion 523. By fitting the light guide plate 514 including the linear portion 514B, in other words, the light guide plate 514 which is not a true circle into the inner space S1 of the annular wall portion 523, the light guide plate 514 can be prevented from being rotated.

For example, circular through holes 523A are formed so as to penetrate the annular wall portion 523 in a front-back direction. When the backlight device 512 and a liquid crystal panel 11 are assembled, a worker overlaps each alignment mark (positioning mark, not shown) provided on the liquid crystal panel 11 with each through hole 523A, whereby the backlight device 512 and the liquid crystal panel 11 can be aligned. The worker can view the alignment mark through the through hole 523A from the back side of the backlight device 512, for example, to confirm that the alignment mark and the through hole 523A are overlapped with each other.

Seventh Embodiment

Next, a seventh embodiment of the present invention will be described with reference to FIGS. 19 to 21. The disposition aspect of LEDs in a backlight device 612 of the present embodiment is different from that of the above embodiment. The same portions as those of the above embodiment are denoted by the same reference numerals, and redundant description is not repeated.

In the present embodiment, in plan view, a group of LEDs 41 and a group of LEDs 42 are disposed with the center C1 of alight entering surface 614A interposed therebetween, and the group of LEDs 41 and the group of LEDs 42 are line-symmetrically disposed with a line L5 passing through the center C1 as a symmetrical axis. The line L5 is angled relative to an X axis. When a straight line connecting the center of the group of LEDs 41 and the center C1 of the light entering surface 614A is a straight line L13 and a straight line connecting the center of the group of LEDs 42 and the center C1 of the light entering surface 614A is a straight line L14, an angle D3 between the straight line L13 and the straight line L14 is set to be smaller than 180°.

Figure 19:
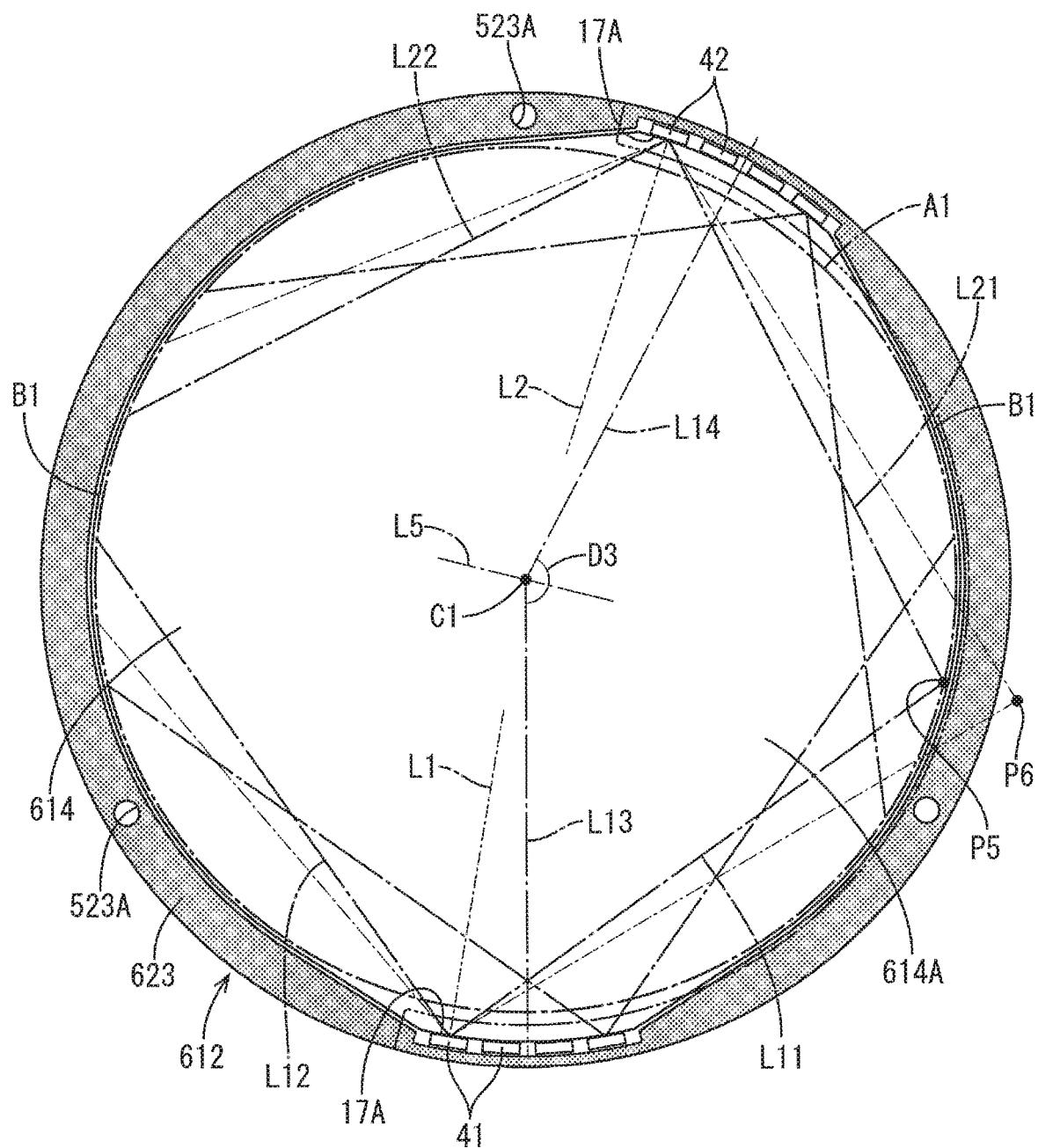
FIG. 19 is a plan view showing a backlight device according to a seventh embodiment.

Here, as shown in FIG. 19, the LEDs 41, 42 each emit light having a predetermined light distribution around an optical axis. The optical axes of the LEDs 41, 42 are located at the center of a light exiting surface 17A, and light that has exited through the light exiting surface 17A is bilaterally symmetrical around the optical axis.

In FIG. 19, among light rays emitted by the LED 41, the light ray that travels in a direction angled to the rightmost side relative to an optical axis L1 is defined as an angled light ray L11 (a first angled light ray). The light ray that travels in a direction angled to the leftmost side relative to the optical axis L1 is defined as an angled light ray L12. In FIG. 19, among light rays emitted by the LED 42 the light ray that travels in a direction angled to the leftmost side (the same side as the travel direction of the angled light ray L11) relative to an optical axis L2 is defined as an angled light ray L21 (a second angled light ray). The light ray that travels in a direction angled to the rightmost side relative to the optical axis L2 is defined as an angle light ray L22. The term "right side" here refers to a right side with respect to the emission direction of light, and the term "left side" refers to a left side with reference to the emission direction of light. Each angled light ray is angled with an angle of, for example, about 39° to 60° relative to the optical axis, but the angle of the angled light ray is not limited thereto. When the light entering surface of a light guide plate is a flat surface, and the material of the light guide plate is polycarbonate (refractive index: 1.59), each angled light ray is angled with an angle of, for example, about 39° relative to the optical axis, but the angle of the angled light ray is not limited to this numerical value.

In the present embodiment, the pair of LEDs 41, 42 are disposed with the line L5 as a symmetrical axis such that an intersection point (P5 or P6 in FIG. 19) between a straight line extending along the angled light ray L11 and a straight line extending along the angled light ray L21 is disposed outside a display area A1 of a liquid crystal panel. The phrase "the intersection point is disposed outside the display area A1 of the liquid crystal panel" here means that "the intersection point is not disposed inside the display area A1 of the liquid crystal panel", and examples thereof include "a case where an intersection point (denoted by reference symbol P5 in FIG. 19) is disposed on a line indicating the outer shape of the display area A1" and "a case where an intersection point (denoted by reference symbol P6 in FIG. 19) is disposed outside the backlight device 612". Such a configuration may be applied to at least one set of LEDs 41, 42 disposed with the line L5 as a symmetrical axis, among the LEDs constituting the group of the LEDs 41 and the group of the LEDs 42.

Figure 20:
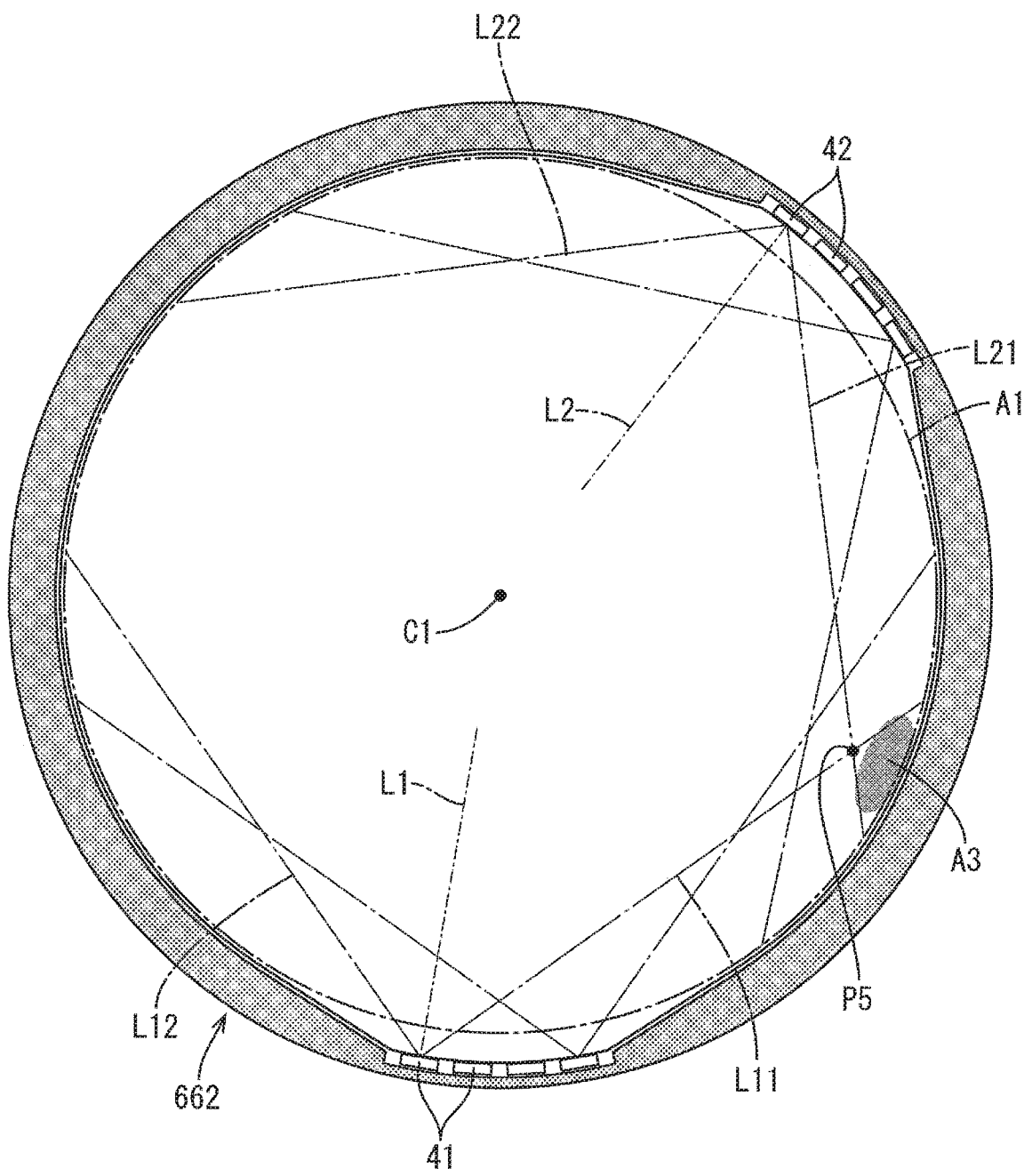
FIG. 20 is a plan view showing Comparative Example according to the seventh embodiment.

As shown in a backlight device 662 in FIG. 20, in a configuration in which the intersection point P5 between the straight line extending along the angled light ray L11 and the straight line extending along the angled light ray L21 is disposed inside the display area A1, a portion A3 that light from the LEDs 41, 42 is less likely to directly reach occurs on the display area A1. The present embodiment makes it possible to reduce the number of places that neither the light emitted by the LED 41 nor the light emitted by the LED 42 reaches in an area overlapped with the display area A1 of the display panel in a light guide plate 614. This can suppress a situation where a dark portion occurs.

Figure 21:
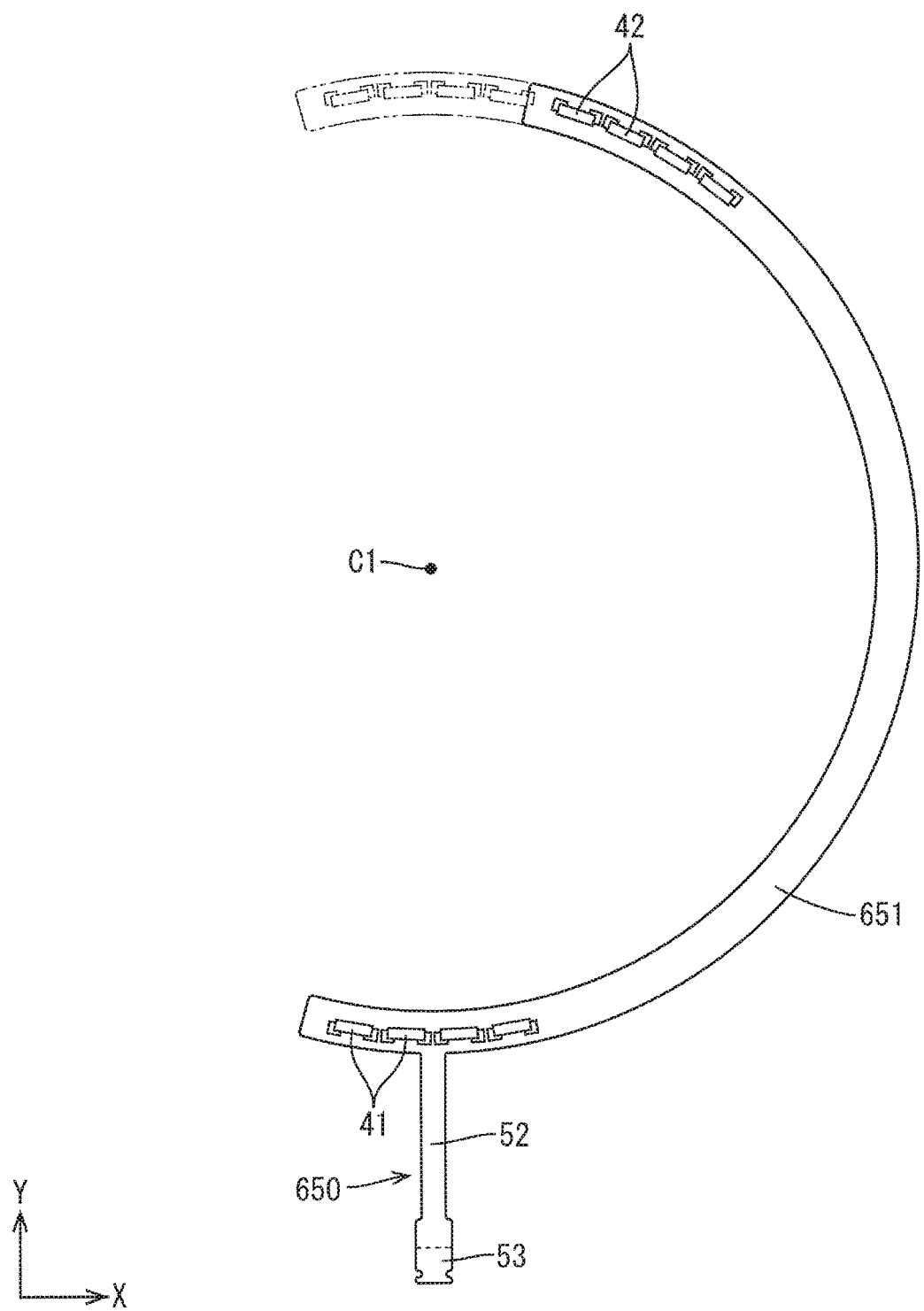
FIG. 21 is a plan view showing an LED substrate according to the seventh embodiment.

As shown in FIG. 21, the configuration of the present embodiment makes it possible to reduce the length of a main body portion 651 of an LED substrate 650 as compared with a configuration in which the group of the LEDs 41 and the group of the LEDs 42 are opposed to each other with the center C1 interposed therebetween (shown by a two-dot chain line in FIG. 21). The LED substrates may be individually provided so as to correspond to the group of LEDs 41 and the group of LEDs 42.

Eighth Embodiment

Next, an eighth embodiment of the present invention will be described with reference to FIGS. 22, 23. In a backlight device 712 of the present embodiment, the shape of a light guide plate 714 is different from that of the above embodiment. The same portions as those of the above embodiment are denoted by the same reference numerals, and redundant description is not repeated.

In the present embodiment, the light guide plate 714 (eventually, a light exiting surface 714A) has an elliptical shape. A light entering surface 731 of the light guide plate 714 is provided on one end portion in the long direction (X axis direction in FIG. 22) of the light guide plate 714, and a light entering surface 732 is provided on the other end portion in the long direction of the light guide plate 714. Multiple LEDs 41 are opposed to the light entering surface 731, and LEDs 42 are opposed to the light entering surface 732.

Figure 22:
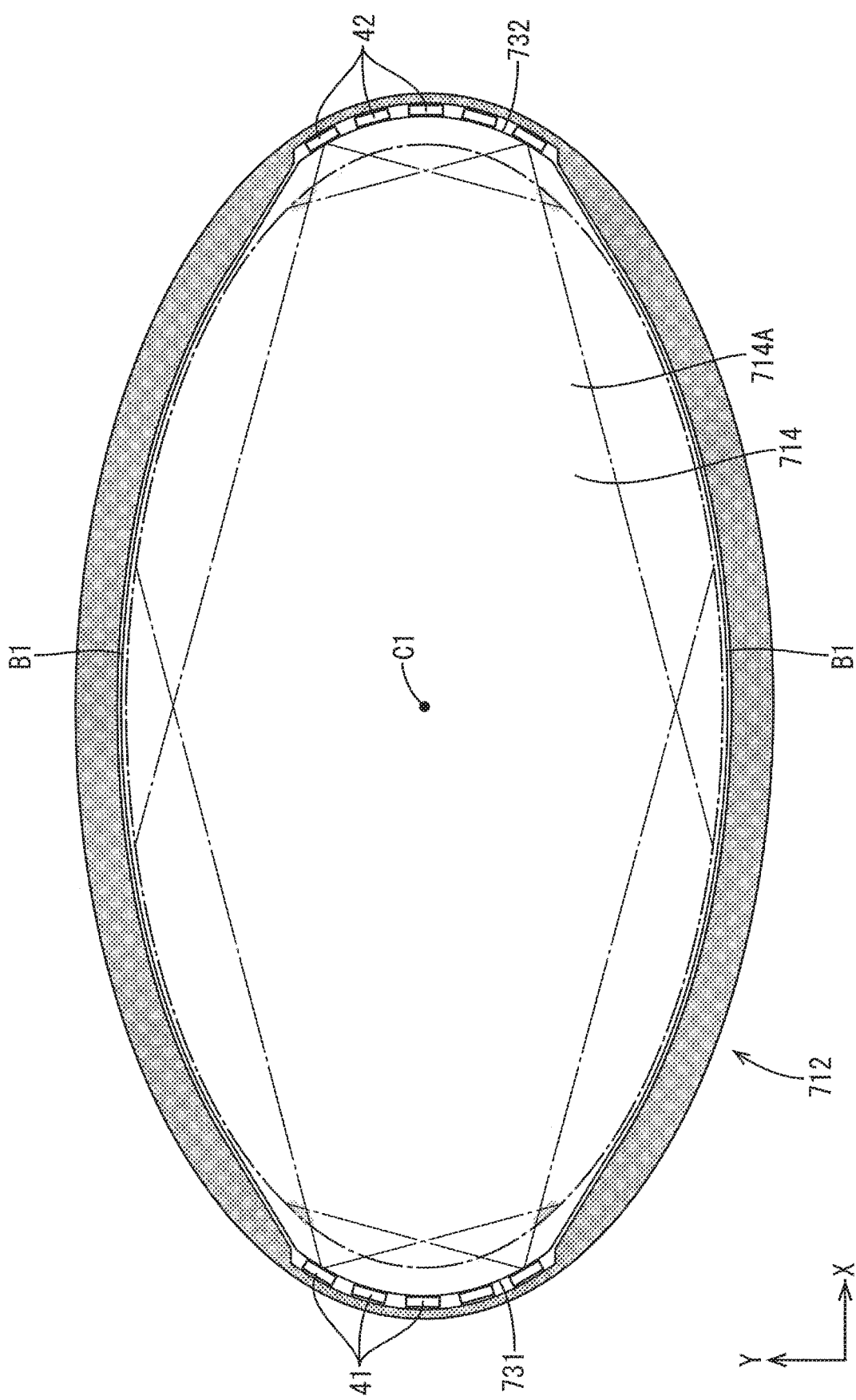
FIG. 22 is a plan view showing a backlight device according to an eighth embodiment.

Such a configuration causes light entering the light guide plate 714 through the light entering surfaces 731, 732 to spread in the short direction of the light guide plate 714 (Y axis direction in FIG. 22). As shown in Comparative Example in FIG. 23, when the LEDs 41, 42 are provided on both end portions in the short direction of the light guide plate 714, light spreads in the long direction of the light guide plate 714. As a result, the light is less likely to reach both the end portions in the long direction, and a dark portion is apt to occur. The light is likely to reach both the end portions in the short direction as compared with both the end portions in the long direction of the light guide plate, whereby the situation where the dark portion occurs can be suppressed.

Other Embodiment

The present invention is not limited to the embodiments which have been described using the foregoing descriptions and the drawings. For example, the following embodiments may also be included in the technical scope of the present invention.

(1) In the above-described embodiments, the configuration in which the case includes only the annular wall portion is exemplified, but the present invention is not limited thereto. For example, the case may include a bottom wall portion.

(2) The number of the LEDs 41, 42 to be disposed is not limited to those exemplified in the above embodiments, and can be appropriately changed. In the above embodiments, the LEDs are exemplified as the light source, but the present invention is not limited thereto. For example, an organic EL or the like may be used as the light source.

(3) In the above embodiments, the liquid crystal panel is exemplified as the display panel, but the present invention can also be applicable to the other types of display panels (plasma display panel (PDP), organic EL panel, electrophoretic display panel (EPD), micro electro mechanical systems (MEMS) display panel or the like).

(4) In the above embodiments, the TFT is used as the switching element of the liquid crystal display device, but switching elements other than the TFT (for example, thin film diode (TFD)) may be used.

EXPLANATION OF SYMBOLS 10, 310 Liquid crystal display device (display device)
11 Liquid crystal panel (display panel)
12, 112, 212, 312, 412, 512, 612, 712 Backlight device (lighting device)
13 Casing
14, 114, 314, 414, 514, 614, 714 Light guide plate
14A, 714A Light emission surface
23, 323, 423, 523 Annular wall portion
31, 231, 331, 431, 731 Light entering surface (first light entering surface)
32, 232, 332, 432, 732 Light entering surface (second light entering surface)
41 LED (first light source)
42 LED (second light source)
114A Through hole
115 Light blocking member
A1 Display area of display panel
B1 Light source non-disposing area
C1 Center of light exiting surface
L1 Optical axis (optical axis of first light source)
L2 Optical axis (optical axis of second light source)
L11 Inclined light (first angled light ray)
L21 Inclined light (second angled light ray)
P5, P6 Intersection point (intersection point between straight line extending along first angled light ray and straight line extending along second angled light ray)

The invention claimed is:

1. A lighting device comprising:
a light guide plate having a circular shape, the light guide plate including:
    a light exiting surface through which light exits, the light exiting surface being one of plate surfaces of the light guide plate; and
    an outer peripheral surface surrounding the light exiting surface, the outer peripheral surface including:
        a first light entering surface; and
        a second light entering surface on an opposite side from the first light entering surface relative to a center of the light exiting surface;
at least one first light source disposed opposite the first light entering surface;
at least one second light source disposed opposite the second light entering surface; and
a case including an annular wall portion surrounding an outer circumference of the light guide plate, the first light source, and the second light source, the annular wall portion including light source non-disposing areas between the first light entering surface and the second light entering surface in which light sources are not disposed, wherein
the light guide plate includes a through hole extending all the way through the light guide plate in a thickness direction,
the light guide plate further includes a light blocking member disposed along an inner surface of the through hole in the light guide plate,
the at least one first light source and the at least one second light source are opposed to each other with the light blocking member therebetween,
the at least one first light source is disposed such that an optical axis of the at least one first light source does not overlap the light blocking member, and
the at least one second light source is disposed such that an optical axis of the at least one second light source does not overlap the light blocking member.

2. The lighting device according to claim 1, wherein the at least one first light source includes a plurality of first light sources disposed adjacent to each other, the at least one second light source includes a plurality of second light sources disposed adjacent to each other, the plurality of first light sources are arranged in a curved form along a shape of the first light entering surface, and the plurality of second light sources are arranged in a curved form along a shape of the second light entering surface.

3. The lighting device according to claim 1, wherein the first light entering surface is at one of ends of the light guide plate with respect to a long direction, and the second light entering surface is at another one of ends of the light guide plate with respect to the long direction.

4. A display device comprising:

the lighting device according to claim 1; and a display panel that displays an image using light from the lighting device.

5. The display device according to claim 4, wherein the at least one first light source and the at least one second light source emit light rays with a predetermined light distribution around the optical axis of the at least one first light source and a predetermined light distribution around the optical axis of the least one second light source, respectively, a light ray traveling in a direction angled relative to the optical axis of the at least one first light source with a largest angle in a plan view among the light rays emitted by the at least one first light source is defined as a first angled light ray, a light ray traveling in a direction angled relative to the optical axis of the at least one second light source with a largest angle in a plan view among the light rays emitted by the at least one second light source is defined as a second angled light ray, an intersection of a straight line extending along the first angled light ray and a straight line extending along the second angled light ray is located outside a display area of the display panel.

6. The lighting device according to claim 1, further comprising:

a first main body portion on which the at least one first light source is mounted;

a second main body portion on which the at least one second light source is mounted; and a connecting portion connecting the first main body portion to the second main body portion.

7. The lighting device according to claim 6, wherein the connecting portion has a linear shape.

8. A lighting device comprising:

a light guide plate having a circular shape, the light guide plate including:

a light exiting surface through which light exits, the light exiting surface being one of plate surfaces of the light guide plate; and an outer peripheral surface surrounding the light exiting surface, the outer peripheral surface including:

a first light entering surface; and a second light entering surface on an opposite side from the first light entering surface relative to a center of the light exiting surface;

at least one first light source disposed opposite the first light entering surface;

at least one second light source disposed opposite the second light entering surface; and a case including an annular wall portion surrounding an outer circumference of the light guide plate, the first light source, and the second light source, the annular wall portion including light source non-disposing areas between the first light entering surface and the second light entering surface in which light sources are not disposed, wherein the at least one first light source includes a plurality of first light sources disposed adjacent to each other, the at least one second light source includes a plurality of second light sources disposed adjacent to each other, the plurality of first light sources are arranged in a curved form along a shape of the first light entering surface, the plurality of second light sources are arranged in a curved form along a shape of the second light entering surface, the plurality of first light sources and the plurality of second light sources are arranged such that a first line connecting a center of the plurality of first light sources and a center of the light exiting surface and a second line connecting a center of the plurality of second light sources and a center of the light exiting surface form an angle less than 180°, the light guide plate includes a through hole extending all the way through the light guide plate in a thickness direction, the light guide plate further includes a light blocking member disposed along an inner surface of the through hole in the light guide plate, and the at least one first light source and the at least one second light source are opposed to each other with the light blocking member therebetween.

* * * * *